(12) United States Patent
Rippelmeyer

(10) Patent No.: US 11,187,277 B2
(45) Date of Patent: Nov. 30, 2021

(54) TRANSMISSION APPARATUS INCLUDING CLUTCH AND PLANETARY GEAR ASSEMBLY FOR A TRANSPORTATION SYSTEM

(71) Applicant: TOYOTA MOTOR NORTH AMERICA, INC., Plano, TX (US)

(72) Inventor: Luke A. Rippelmeyer, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 124 days.

(21) Appl. No.: 16/255,386

(22) Filed: Jan. 23, 2019

(65) Prior Publication Data
US 2020/0232543 A1   Jul. 23, 2020

(51) Int. Cl.
*F16D 11/14*       (2006.01)
*F16H 63/30*       (2006.01)
*F16D 11/00*       (2006.01)

(52) U.S. Cl.
CPC ............ *F16D 11/14* (2013.01); *F16H 63/30* (2013.01); *F16D 2011/004* (2013.01); *F16H 2063/3093* (2013.01); *F16H 2200/2005* (2013.01); *F16H 2200/2064* (2013.01); *F16H 2200/2094* (2013.01); *F16H 2200/2097* (2013.01)

(58) Field of Classification Search
CPC ..... F16H 2200/2005; F16H 2200/2064; F16H 2200/2094; F16H 2200/2041; F16H 2200/2097
See application file for complete search history.

(56) References Cited

U.S. PATENT DOCUMENTS

| 2,871,726 | A | * | 2/1959 | Kamlukin | F16H 3/663 475/219 |
| 4,417,484 | A | * | 11/1983 | Gaus | F16H 3/663 475/276 |
| 4,721,194 | A | | 1/1988 | Frost | |
| 5,135,444 | A | * | 8/1992 | Hattori | F16H 3/663 475/285 |
| 5,657,664 | A | | 8/1997 | Birchmeier | |
| 5,769,750 | A | * | 6/1998 | Rickels | B62M 11/16 192/217.2 |

(Continued)

FOREIGN PATENT DOCUMENTS

| CN | 103742613 A | 4/2014 |
| CN | 104653726 A | 5/2015 |
| DE | 202014001121 U1 | 6/2015 |

*Primary Examiner* — Timothy Hannon
(74) *Attorney, Agent, or Firm* — Haynes and Boone, LLP

(57) ABSTRACT

A transmission apparatus and associated methods for a transportation system. The transmission apparatus includes a clutch assembly and a planetary gear assembly. The clutch assembly includes a clutch hub, a first clutch sleeve, and a second clutch sleeve. The first clutch sleeve is axially movable relative to the clutch hub to selectively engage a first component of a planetary gear assembly. The second clutch sleeve is axially movable relative to the clutch hub to selectively engage a second component of the planetary gear assembly. The planetary gear assembly includes a plurality of planet gears and a planet carrier. Each of the plurality of planet gears is supported in a rotatable manner by the planet carrier. In some embodiments, the first component of the planetary gear assembly is a first sun gear that engages each of the plurality of planet gears.

12 Claims, 23 Drawing Sheets

(56) References Cited

U.S. PATENT DOCUMENTS

| | | | |
|---|---|---|---|
| 6,364,804 B1* | 4/2002 | Haka | F16H 3/663 |
| | | | 475/278 |
| 7,387,588 B2 | 6/2008 | Bader | |
| 8,235,859 B2* | 8/2012 | Yun | B62M 11/06 |
| | | | 475/290 |
| 8,360,922 B2* | 1/2013 | Kraynev | F16H 3/663 |
| | | | 475/277 |
| 9,366,321 B2 | 6/2016 | Zhang | |
| 9,920,818 B2 | 3/2018 | Wright | |
| 2003/0228951 A1* | 12/2003 | Haka | F16H 3/663 |
| | | | 475/303 |
| 2008/0081726 A1 | 4/2008 | Saito et al. | |
| 2008/0176696 A1* | 7/2008 | Bucknor | F16H 3/728 |
| | | | 475/5 |
| 2009/0098974 A1* | 4/2009 | Phillips | F16H 3/663 |
| | | | 475/213 |
| 2011/0230299 A1* | 9/2011 | Kraynev | F16H 37/042 |
| | | | 475/219 |
| 2019/0195289 A1* | 6/2019 | Marcello | F16D 11/14 |

* cited by examiner

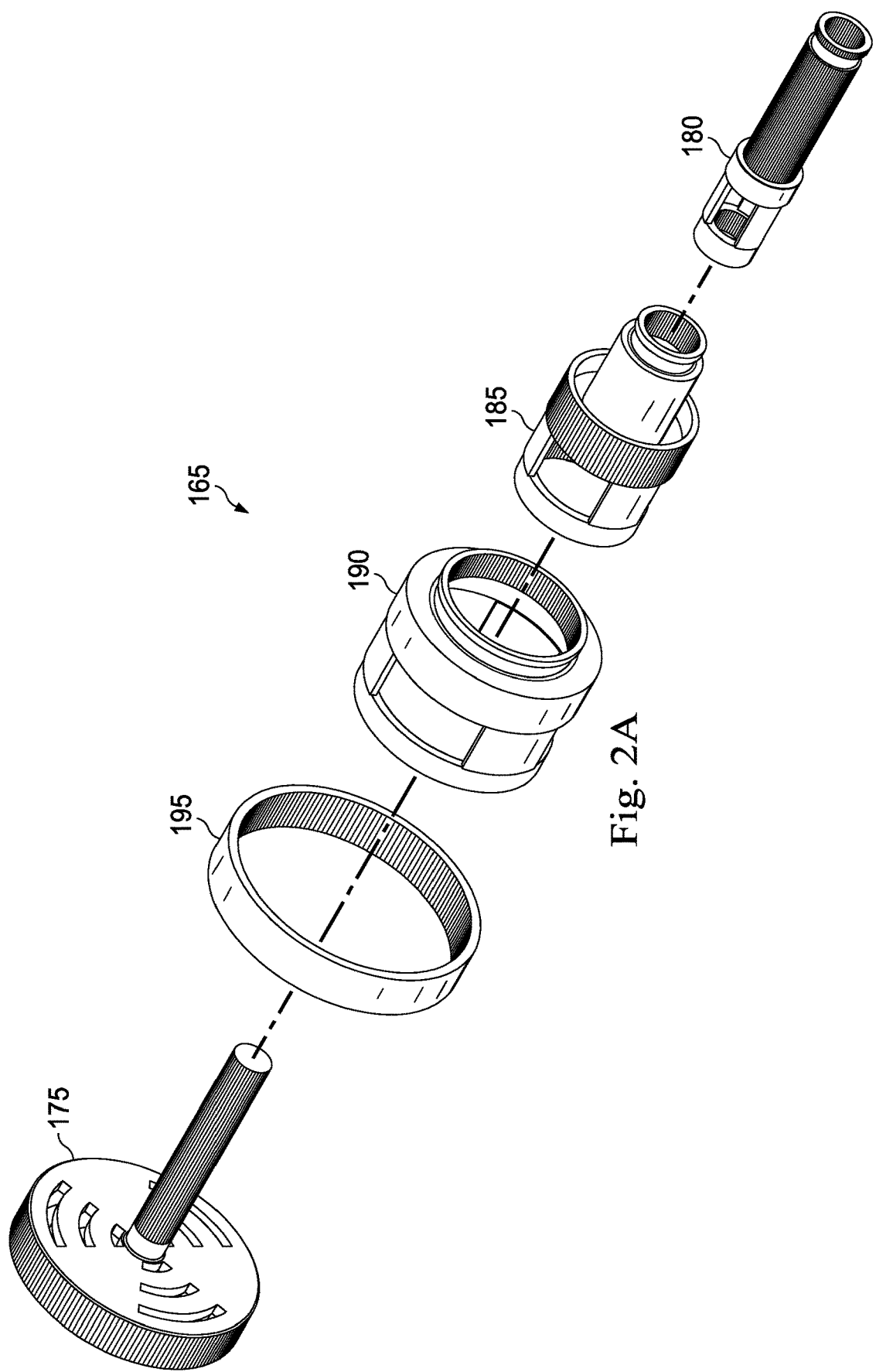

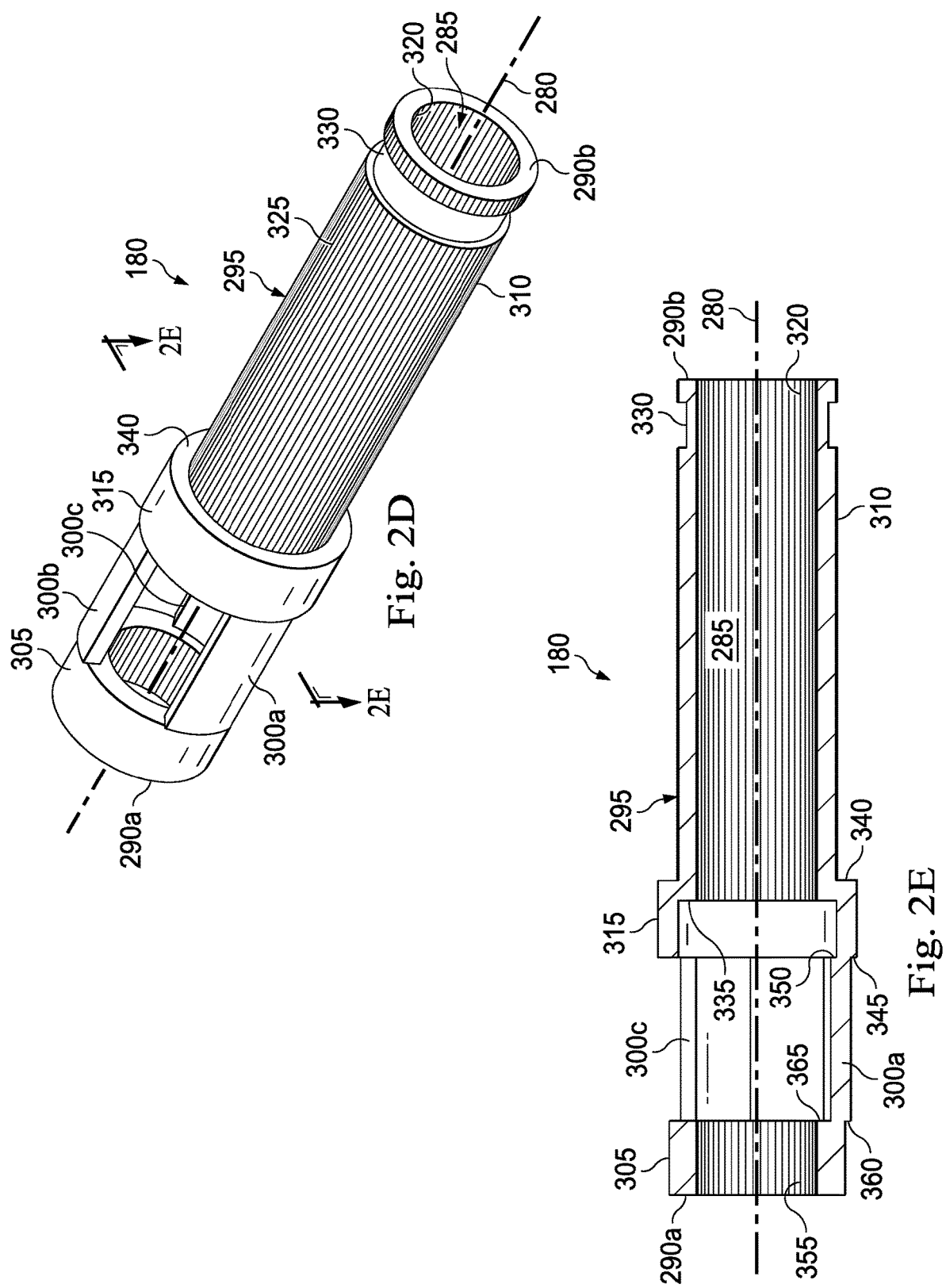

TRANSMISSION APPARATUS INCLUDING CLUTCH AND PLANETARY GEAR ASSEMBLY FOR A TRANSPORTATION SYSTEM

TECHNICAL FIELD

The present disclosure relates generally to vehicle transmissions and, more particularly, to a transmission apparatus including a clutch assembly and a planetary gear assembly.

BACKGROUND

Electric vehicles ("EV") and fuel cell electric vehicles ("FCEV") have the potential to grab a large market share within the on-road heavy duty trucking market (among others). This is especially true for urban applications requiring greater maneuverability within close quarters. However, vehicles within this market must overcome significant cost constraints to maximize profitability. For this reason, many of the existing vehicles within this market have been built using automated-manual type transmissions. However, in EV and FCEV applications, the traditional diesel/gasoline engine is removed and replaced with additional components (batteries, fuel cell, etc.) that must be packaged. To facilitate this packaging, the electric motor and transmission must be moved farther back towards the drive axle as compared with traditional diesel/gasoline engine vehicles. It would therefore be desirable to shorten the drive system (as compared to existing drive systems having automated-manual type transmissions) while keeping costs low. Additionally, it would be desirable to shorten the vehicle's wheelbase as much as possible in order to maximize the steering angle and provide greater maneuverability within close quarters. Therefore, what is needed is an apparatus, system, or method that addressed on or more of the foregoing issues, and/or one or more other issues.

BRIEF DESCRIPTION OF THE DRAWINGS

FIG. 2A is an exploded perspective view of the clutch assembly of FIG. 1B, the clutch assembly including a clutch hub and first, second, third, and fourth clutch sleeves, according to one or more embodiments of the present disclosure.

FIG. 2D is a perspective view of the first clutch sleeve of FIG. 2A, according to one or more embodiments of the present disclosure.

FIG. 2E is a cross-sectional view of the first clutch sleeve of FIG. 2D taken along the line 2E-2E of FIG. 2D, according to one or more embodiments of the present disclosure.

SUMMARY

Figure 1A:
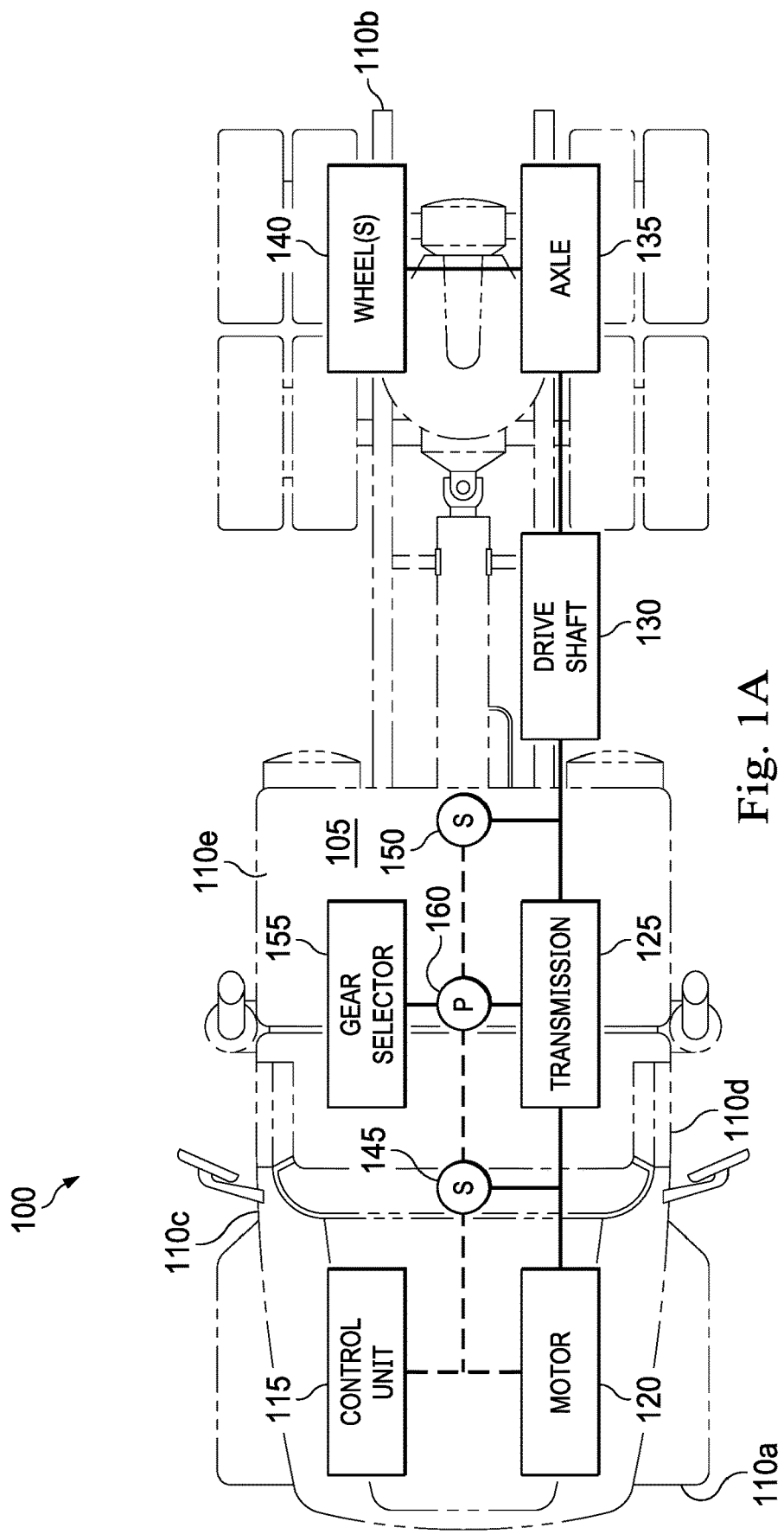
FIG. 1A is a diagrammatic illustration of a transportation system including a transmission apparatus, according to one or more embodiments of the present disclosure.

The present disclosure introduces a first transmission apparatus. The transmission apparatus generally includes a clutch assembly, including: a clutch hub; a first clutch sleeve coupled to, and coaxial with, the clutch hub, wherein the first clutch sleeve is axially movable relative to the clutch hub to selectively engage a first component of a planetary gear assembly; and a second clutch sleeve coupled to, and coaxial with, the clutch hub and/or the first clutch sleeve, wherein the second clutch sleeve is axially movable relative to the clutch hub to selectively engage a second component of the planetary gear assembly. The present disclosure also introduces a second transmission apparatus. The second transmission apparatus generally includes a planetary gear assembly, including: a plurality of planet gears; a planet carrier supporting each of the plurality of planet gears in a rotatable manner; and first and second components; wherein the first component is selectively engageable by a clutch assembly to rotate the planet carrier when the second component is disengaged from the clutch assembly; wherein the second component is selectively engageable by the clutch assembly to rotate the planet carrier when the first component is disengaged from the clutch assembly; and wherein the first component of the planetary gear assembly is a first sun gear that engages first gear teeth on each of the plurality of planet gears.

The present disclosure also introduces a method. The method generally includes detecting, using a position sensor, a neutral position of a transmission while the transmission is being shifted from one gear, in which a clutch assembly of the transmission engages a first component of a planetary gear assembly of the transmission, to another gear, in which the clutch assembly engages a second component of the planetary gear assembly, wherein, in the neutral position of the transmission, the clutch assembly is disengaged from the planetary gear assembly; and during shifting of the transmission, when the clutch assembly is disengaged from the planetary gear assembly: detecting, using first and second speed sensors, rotational speeds of the clutch assembly and the planetary gear assembly, respectively; and controlling, using a control unit and based on the detected neutral position of the transmission and the detected rotational speeds of the clutch assembly and the planetary gear assembly, a motor coupled to the clutch assembly so that a rotational speed of the clutch assembly is within a predetermined range of a rotational speed of the second component.

DETAILED DESCRIPTION

The present disclosure introduces a transmission having a clutch assembly and a planetary gear assembly that, when combined, are substantially shorter than a traditional automated-manual type transmission. In some embodiments, the clutch assembly and the planetary gear assembly are housed within the same housing. The clutch assembly enables the planetary gear assembly to be operated in a manner having at least some similarities to a traditional automated-manual type transmission for heavy-duty trucking applications. However, when operated in combination with the planetary gear assembly, the clutch assembly reduces the length, mass, shift times, and costs associated with traditional automated-manual type transmissions while still meeting durability requirements. The clutch assembly includes multiple clutch sleeves attached to a single clutch hub and actuable by a gear selector having shift forks extending therefrom. In some embodiments, the shift forks and the clutch sleeves are coaxial with the clutch hub. Further, in some embodiments, when assembled, the planetary gear assembly is coaxial with the clutch hub. In some embodiments, the clutch sleeves are each two-piece components passing through windows in the clutch hub so that the shift forks extending from the gear selector can selectively shift the clutch sleeves to engage different components of the planetary gear assembly. When combined, the clutch assembly and the planetary gear assembly provide a compact multispeed transmission that is significantly more compact and power dense than the incumbent layshaft automated-manual type transmission architecture.

Figure 1B:
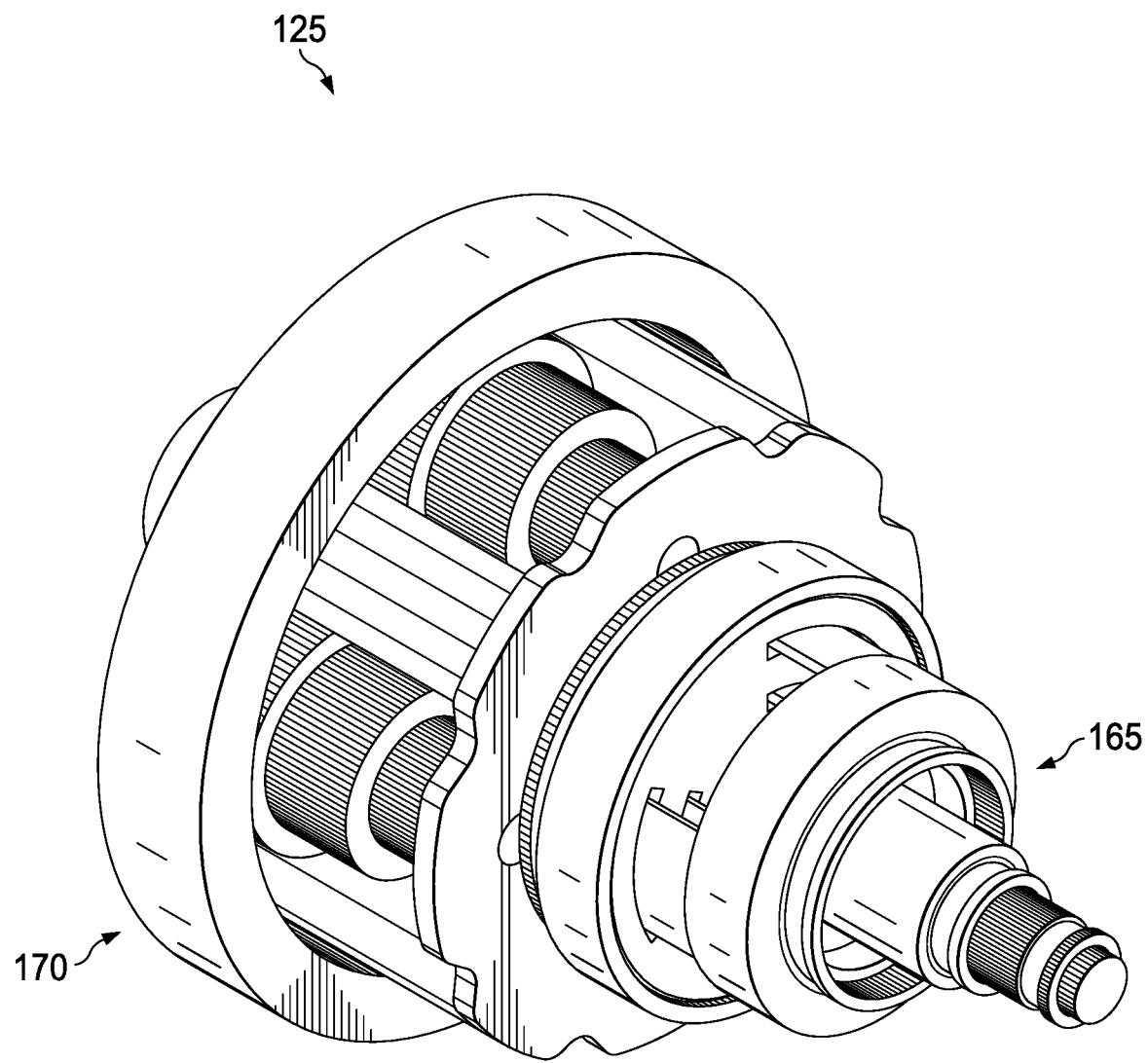
FIG. 1B is a perspective view of the transmission apparatus of FIG. 1A, the transmission apparatus including a clutch assembly and a planetary gear assembly, according to one or more embodiments of the present disclosure.

Referring to FIGS. 1A and 1B, in an embodiment, a transportation system incorporating the transmission introduced by the present disclosure is generally referred to by the reference numeral 100 and includes a vehicle 105, such as a truck (e.g., a heavy-duty truck). The vehicle 105 may be an electric vehicle or a fuel cell electric vehicle. As shown in FIG. 1A, the vehicle 105 may include a front portion 110*a* (including a front bumper and a hood), a rear portion 110*b* (including a rear bumper and a fifth-wheel), a right side portion 110*c* (including a right front quarter panel and a right front door), a left side portion 110*d* (including a left front quarter panel and a left front door), and a top portion 110*e* (including a roof). The vehicle 105 includes a control unit 115, a motor 120, a transmission apparatus 125, a drive shaft 130, an axle 135, and drive wheel(s) 140. The motor 120 may be an electric motor. The control unit 115 controls a rotational output produced by the motor 120. The transmission apparatus 125 is operably coupled to the motor 120 so that the rotational output produced by the motor 120 is received by the transmission apparatus 125. A speed sensor 145 detects a rotational speed of the motor 120's output (e.g., at the motor 120, at the transmission apparatus 125, between the motor 120 and the transmission apparatus 125, etc.) and communicates the detected rotational speed to the control unit 115. The drive shaft 130 is operably coupled to the transmission apparatus 125 so that rotational output from the transmission apparatus 125 is received by the drive shaft 130. The axle 135 and the drive wheel(s) 140 are operably coupled to the drive shaft 130 so that rotational output from the drive shaft 130 propels the vehicle 105 by rotating the drive wheel(s) 140. A speed sensor 150 detects a rotational speed of the transmission apparatus 125's output (e.g., at the transmission apparatus 125, at the drive shaft 130, at the axle 135, at the drive wheel(s) 140, between the transmission apparatus 125 and the drive shaft 130, between the drive shaft 130 and the axle 135, between the axle 135 and the drive wheel(s) 140, etc.) and communicates the detected rotational speed to the control unit 115. A gear selector 155 (e.g., operable by hand, by foot, or automatically) is operably coupled to the transmission apparatus 125 to control the transfer of rotation from the transmission apparatus 125 to the drive shaft 130. A position sensor 160 detects a position of the transmission apparatus 125 (e.g., neutral, first gear, second gear, third gear, fourth gear, etc.) and communicates the detected position to the control unit 115. As shown in FIG. 1B, in an embodiment, the transmission apparatus 125 includes a clutch assembly 165 and a planetary gear assembly 170.

Figure 2B:
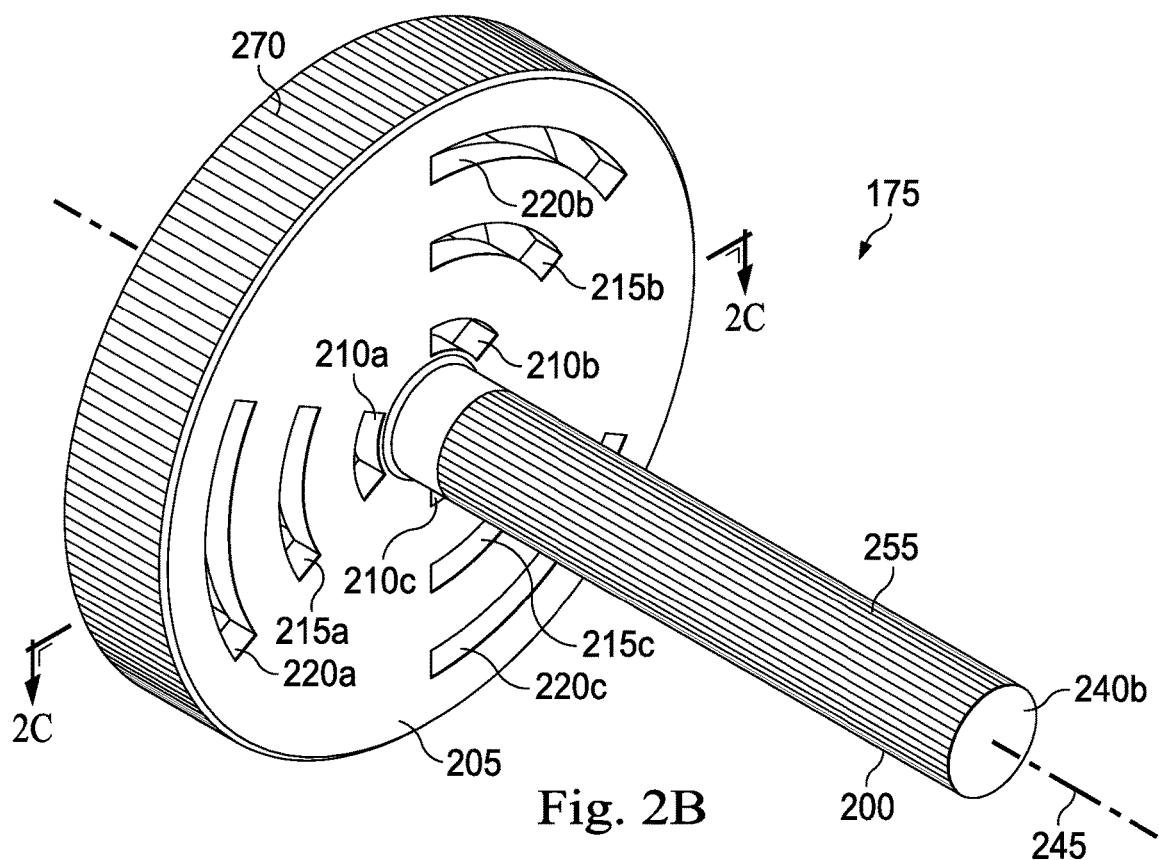
FIG. 2B is a perspective view of the clutch hub of FIG. 2A, according to one or more embodiments of the present disclosure.
Figure 2C:
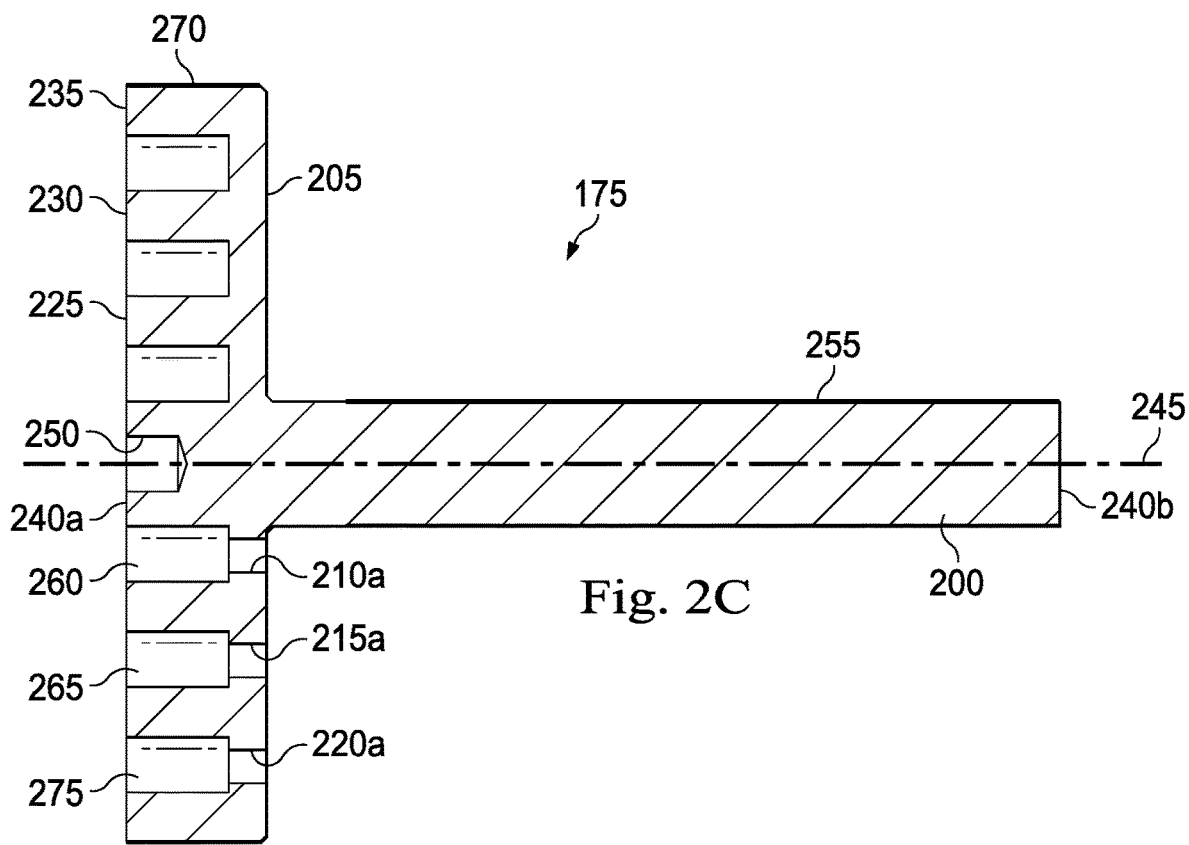
FIG. 2C is a cross-sectional view of the clutch hub of FIG. 2B taken along the line 2C-2C of FIG. 2B, according to one or more embodiments of the present disclosure.

Referring to FIG. 2A, the clutch assembly 165 includes a clutch hub 175 and clutch sleeves 180, 185, 190, and 195. Turning to FIGS. 2B and 2C with continuing reference to FIG. 2A, the clutch hub 175 includes an input shaft 200, a plate 205, windows 210, 215, and 220, and wall segments 225, 230, and 235. The input shaft 200 defines opposing end portions 240a and 240b and extends along a longitudinal center axis 245. The input shaft 200 includes a blind hole 250 proximate the end portion 240a. The blind hole 250 is formed into the input shaft 200 along the longitudinal center axis 245. The input shaft 200 includes an external spline 255 proximate the end portion 240b. The plate 205 extends radially from the input shaft 200 proximate the end portion 240a. The plate 205 is circular. The plate 205 extends concentrically about the longitudinal center axis 245. The wall segment 225 extends from the plate 205 in a direction opposite the end portion 240b. The wall segment 225 extends circumferentially about the longitudinal center axis 245. The wall segment 225 is cylindrical. The wall segment 225 extends concentrically about the longitudinal center axis 245. An annulus 260 is defined between the wall segment 225 and the input shaft 200 at the end portion 240a. The wall segment 230 extends from the plate 205 in a direction opposite the end portion 240b. The wall segment 230 is radially spaced outwardly from the wall segment 225. The wall segment 230 extends circumferentially about the longitudinal center axis 245. The wall segment 230 is cylindrical. The wall segment 230 extends concentrically about the longitudinal center axis 245. An annulus 265 is defined between the wall segments 225 and 230. The wall segment 235 extends from the plate 205 in a direction opposite the end portion 240b. The wall segment 235 is radially spaced outwardly from the wall segment 230. The wall segment 235 extends circumferentially about the longitudinal center axis 245. The wall segment 235 includes an external spline 270. The wall segment 235 is cylindrical. The wall segment 235 extends concentrically about the longitudinal center axis 245. An annulus 275 is defined between the wall segments 230 and 235.

In some embodiments, as in FIGS. 2B and 2C, the clutch hub 175 includes three of the windows 210, as indicated by suffixes a, b, and c. The windows 210a-c each extend through the plate 205 from the annulus 260. In addition, the windows 210a-c each extend arcuately from one to the other of two separate radii extending from the longitudinal center axis 245 and spaced apart by a first angle. In some embodiments, the first angle by which the two separate radii are spaced apart is within +1-10% of 360/2n, where n equals the number of windows 210 formed in the clutch hub 175; as a result, in the embodiment of FIGS. 2B and 2C, the first angle would be within +/−10% of 60 degrees. The windows 210a-c are circumferentially spaced about the longitudinal center axis 245. In some embodiments, the windows 210a-c are circumferentially spaced about the longitudinal center axis 245 at equal intervals (e.g., intervals of 120 degrees in the embodiment of FIGS. 2B and 2C). Although shown in FIGS. 2B and 2C including three of the windows 210, as indicated by the suffixes a, b, and c, the clutch hub 175 may instead include one, two, four, or more of the windows 210.

In some embodiments, as in FIGS. 2B and 2C, the clutch hub 175 includes three of the windows 215, as indicated by suffixes a, b, and c. The windows 215a-c are radially spaced outwardly from the windows 210a-c. The windows 215a-c each extend through the plate 205 from the annulus 265. In addition, the windows 215a-c each extend arcuately from one to the other of two separate radii extending from the longitudinal center axis 245 and spaced apart by a second angle. In some embodiments, the second angle by which the two separate radii are spaced apart is within +1-10% of 360/2n, where n equals the number of windows 215 formed in the clutch hub 175; as a result, in the embodiment of FIGS. 2B and 2C, the second angle would be within +/−10% of 60 degrees. The windows 215a-c are circumferentially spaced about the longitudinal center axis 245. In some embodiments, the windows 215a-c are circumferentially spaced about the longitudinal center axis 245 at equal intervals (e.g., intervals of 120 degrees in the embodiment of FIGS. 2B and 2C). Although shown in FIGS. 2B and 2C including three of the windows 215, as indicated by the suffixes a, b, and c, the clutch hub 175 may instead include one, two, four, or more of the windows 215.

In some embodiments, as in FIGS. 2B and 2C, the clutch hub 175 includes three of the windows 220, as indicated by suffixes a, b, and c. The windows 220a-c are radially spaced outwardly from the windows 215a-c. The windows 220a-c each extend through the plate 205 from the annulus 275. In addition, the windows 220a-c each extend arcuately from one to the other of two separate radii extending from the longitudinal center axis 245 and spaced apart by a third angle. In some embodiments, the third angle by which the two separate radii are spaced apart is within +/−10% of 360/2n, where n equals the number of windows 220 formed in the clutch hub 175; as a result, in the embodiment of FIGS. 2B and 2C, the third angle would be within +/−10% of 60 degrees. The windows 220a-c are circumferentially spaced about the longitudinal center axis 245. In some embodiments, the windows 220a-c are circumferentially spaced about the longitudinal center axis 245 at equal intervals (e.g., intervals of 120 degrees in the embodiment of FIGS. 2B and 2C). Although shown in FIGS. 2B and 2C including three of the windows 220, as indicated by the suffixes a, b, and c, the clutch hub 175 may instead include one, two, four, or more of the windows 220. In various embodiments, the two separate radii from one to the other of which the windows 210a, 215a, and/or 220a extend are the same radii, the two separate radii from one to the other of which the windows 210b, 215b, and/or 220b extend are the same radii, and/or the two separate radii from one to the other of which the windows 210c, 215c, and/or 220c extend are the same radii.

Turning to FIGS. 2D and 2E with continuing reference to FIG. 2A, in an embodiment, the clutch sleeve 180 is a generally tubular member extending along a longitudinal center axis 280 and defining an internal passage 285 and opposing end portions 290a and 290b. The clutch sleeve 180 includes a shift sleeve 295, fingers 300, and a dog clutch 305. The shift sleeve 295 includes wall segments 310 and 315. The wall segment 310 extends circumferentially about the longitudinal center axis 280. The wall segment 310 includes an internal spline 320. The wall segment 310 includes an external spline 325. The wall segment 310 is cylindrical. An external groove 330 is formed in the wall segment 310 proximate the end portion 290b. The external groove 330 is annular. The wall segment 315 extends circumferentially about the longitudinal center axis 280. The wall segment 315 is connected to the wall segment 310; for example, as in FIGS. 2D and 2E, the wall segment 315 may be connected directly to the wall segment 310. In addition to, or instead of, the external spline 325 of the wall segment 310, the wall segment 315 may also include an external spline. The wall segment 315 is cylindrical. The wall segment 310 forms an internal shoulder 335 in the clutch sleeve 180. The internal shoulder 335 faces in a direction opposite the end portion 290b. In addition, the wall segment 315 forms an external shoulder 340 in the clutch sleeve 180. The external shoulder 340 faces in a direction opposite the end portion 290a. The external shoulder 340 is spaced relatively closer to the end portion 290b (and farther from the end portion 290a) than the internal shoulder 335.

In some embodiments, as in FIGS. 2D and 2E, the clutch sleeve 180 includes three of the fingers 300, as indicated by suffixes a, b, and c. The fingers 300a-c each extend in a direction parallel to the longitudinal center axis 280. The fingers 300a-c are connected to the wall segment 315 opposite the wall segment 310; for example, as in FIGS. 2D and 2E, the fingers 300a-c may be connected directly to the wall segment 315. The fingers 300a-c each extend arcuately from one to the other of two separate radii extending from the longitudinal center axis 280 and spaced apart by an angle a4. In some embodiments, the angle a4 by which the two separate radii are spaced apart is less than the first angle defined by each of the windows 210a-c. The fingers 300a-c are circumferentially spaced about the longitudinal center axis 280. In some embodiments, the fingers 300a-c are circumferentially spaced about the longitudinal center axis 280 at equal intervals (e.g., intervals of 120 degrees in the embodiment of FIGS. 2D and 2E). The wall segment 315 forms an external shoulder 345 in the clutch sleeve 180. The external shoulder 345 faces in a direction opposite the end portion 290b. In addition, the fingers 300a-c each form at least respective portions of an internal shoulder 350 in the clutch sleeve 180. The internal shoulder 350 faces in a direction opposite the end portion 290a. In some embodiments, the internal and external shoulders 350 and 345, respectively, are equally spaced from the end portion 290a (and the end portion 290b). Although shown in FIGS. 2D and 2E including three of the fingers 300, as indicated by the suffixes a, b, and c, the clutch sleeve 180 may instead include one, two, four, or more of the fingers 300.

The dog clutch 305 extends circumferentially about the longitudinal center axis 280. The dog clutch 305 is connected to the fingers 300a-c opposite the wall segment 315; for example, as in FIGS. 2D and 2E, the dog clutch 305 may be connected directly to the fingers 300a-c. The dog clutch 305 is cylindrical. The dog clutch 305 includes internal clutch teeth 355 proximate the end portion 290a. The fingers 300a-c each form at least respective portions of an external shoulder 360 in the clutch sleeve 180. The external shoulder 360 faces in a direction opposite the end portion 290b. In addition, the dog clutch 305 forms an internal shoulder 365 in the clutch sleeve 180. The internal shoulder 365 faces in a direction opposite the end portion 290a. In some embodiments, the internal and external shoulders 365 and 360, respectively, are equally spaced from the end portion 290a (and the end portion 290b).

Figure 2F:
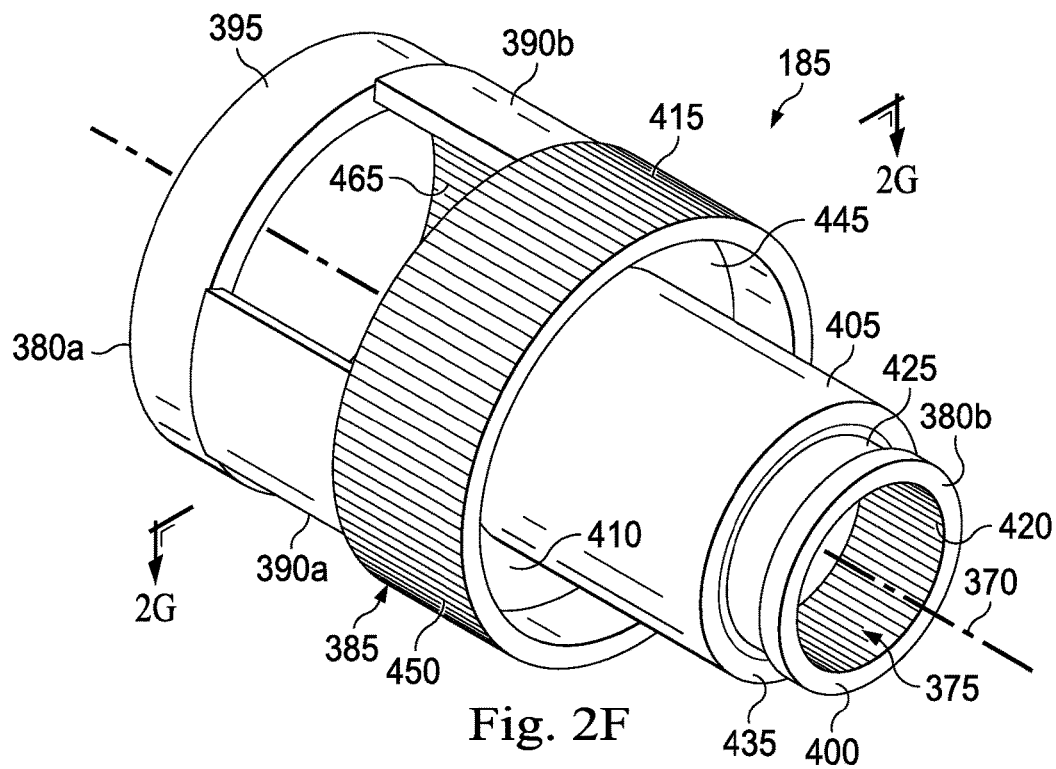
FIG. 2F is a perspective view of the second clutch sleeve of FIG. 2A, according to one or more embodiments of the present disclosure.
Figure 2G:
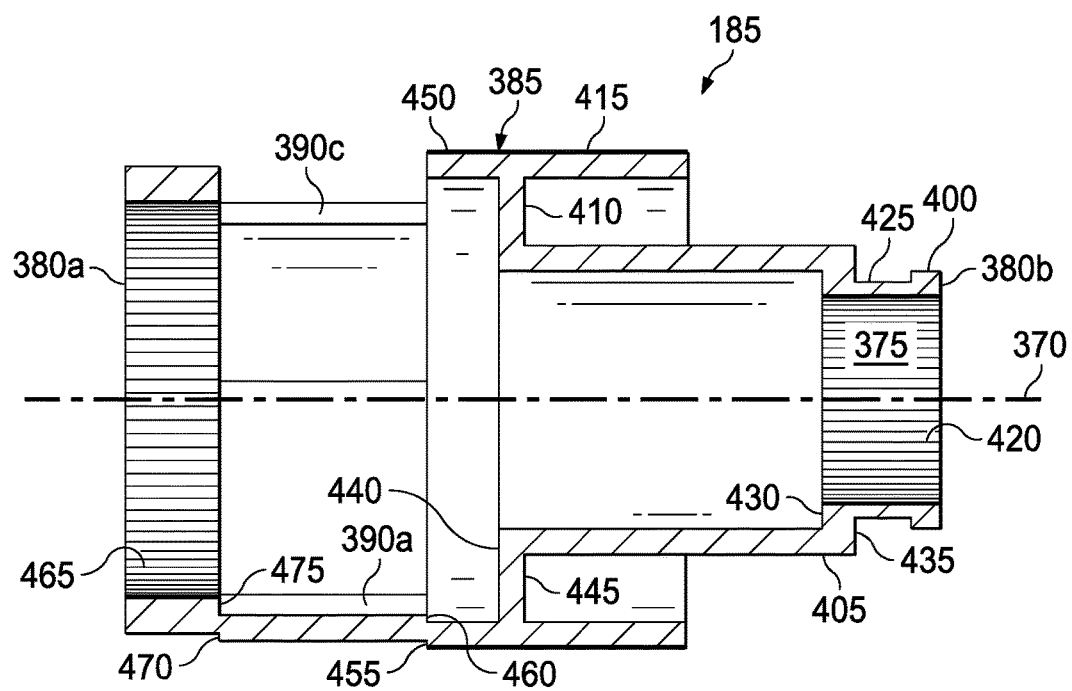
FIG. 2G is a cross-sectional view of the second clutch sleeve of FIG. 2F taken along the line 2G-2G of FIG. 2F, according to one or more embodiments of the present disclosure.

Turning to FIGS. 2F and 2G with continuing reference to FIG. 2A, in an embodiment, the clutch sleeve 185 is a generally tubular member extending along a longitudinal center axis 370 and defining an internal passage 375 and opposing end portions 380a and 380b. The clutch sleeve 185 includes a shift sleeve 385, fingers 390, and a dog clutch 395. The shift sleeve 385 includes wall segments 400, 405, 410, and 415. The wall segment 400 extends circumferentially about the longitudinal center axis 370. The wall segment 400 includes an internal spline 420. The wall segment 400 is cylindrical. An external groove 425 is formed in the wall segment 400 proximate the end portion 380b. The external groove 425 is annular. The wall segment 405 extends circumferentially about the longitudinal center axis 370. The wall segment 405 is connected to the wall segment 400; for example, as in FIGS. 2F and 2G, the wall segment 405 may be connected directly to the wall segment 400. In addition to, or instead of, the internal spline 420 of the wall segment 400, the wall segment 405 may also include an internal spline. The wall segment 405 is cylindrical. The wall segment 400 forms an internal shoulder 430 in the clutch sleeve 185. The internal shoulder 430 faces in a direction opposite the end portion 380b. In addition, the wall segment 405 forms an external shoulder 435 in the clutch sleeve 185. The external shoulder 435 faces in a direction opposite the end portion 380a. The external shoulder 435 is spaced relatively closer to the end portion 380b (and farther from the end portion 380a) than the internal shoulder 430.

The wall segment 410 extends circumferentially about the longitudinal center axis 370 and radially outwardly from the wall segment 405. The wall segment 410 is connected to the wall segment 405 opposite the wall segment 400; for example, as in FIGS. 2F and 2G, the wall segment 410 may be connected directly to the wall segment 405. The wall segment 410 forms an internal shoulder 440 in the clutch sleeve 185. The internal shoulder 440 faces in a direction opposite the end portion 380b. In addition, the wall segment 410 forms an external shoulder 445 in the clutch sleeve 185. The external shoulder 445 faces in a direction opposite the end portion 380a. The external shoulder 445 is spaced relatively closer to the end portion 380b (and farther from the end portion 380a) than the internal shoulder 440. The wall segment 415 extends circumferentially about the longitudinal center axis 370. The wall segment 415 is connected to the wall segment 410 opposite the wall segment 405; for example, as in FIGS. 2F and 2G, the wall segment 415 may be connected directly to the wall segment 410. The wall segment 415 includes an external spline 450. The wall segment 415 is cylindrical. The wall segment 415 extends past the internal shoulder 440 in a direction opposite the end portion 380b, and past the external shoulder 445 in a direction opposite the end portion 380a.

In some embodiments, as in FIGS. 2F and 2G, the clutch sleeve 185 includes three of the fingers 390, as indicated by suffixes a, b, and c. The fingers 390a-c each extend in a direction parallel to the longitudinal center axis 370. The fingers 390a-c are connected to a portion of the wall segment 415 extending past the internal shoulder 440 in the direction opposite the end portion 380b; for example, as in FIGS. 2F and 2G, the fingers 390a-c may be connected directly to the wall segment 415. The fingers 390a-c each extend arcuately from one to the other of two separate radii extending from the longitudinal center axis 370 and spaced apart by an angle a5. In some embodiments, the angle a5 by which the two separate radii are spaced apart is less than the second angle defined by each of the windows 2a-c. The fingers 390a-c are circumferentially spaced about the longitudinal center axis 370. In some embodiments, the fingers 390*a*-*c* are circumferentially spaced about the longitudinal center axis 370 at equal intervals (e.g., intervals of 120 degrees in the embodiment of FIGS. 2F and 2G). The wall segment 415 forms an external shoulder 455 in the clutch sleeve 185. The external shoulder 455 faces in a direction opposite the end portion 380*b*. In addition, the fingers 390*a*-*c* each form at least respective portions of an internal shoulder 460 in the clutch sleeve 185. The internal shoulder 460 faces in a direction opposite the end portion 380*a*. In some embodiments, the internal and external shoulders 460 and 455, respectively, are equally spaced from the end portion 380*a* (and the end portion 380*b*). Although shown in FIGS. 2F and 2G including three of the fingers 390, as indicated by the suffixes a, b, and c, the clutch sleeve 185 may instead include one, two, four, or more of the fingers 390.

The dog clutch 395 extends circumferentially about the longitudinal center axis 370. The dog clutch 395 is connected to the fingers 390*a*-*c* opposite the wall segment 415; for example, as in FIGS. 2F and 2G, the dog clutch 395 may be connected directly to the fingers 390*a*-*c*. The dog clutch 395 is cylindrical. The dog clutch 395 includes internal clutch teeth 465 proximate the end portion 380*a*. The fingers 390*a*-*c* each form at least respective portions of an external shoulder 470 in the clutch sleeve 185. The external shoulder 470 faces in a direction opposite the end portion 380*b*. In addition, the dog clutch 395 forms an internal shoulder 475 in the clutch sleeve 185. The internal shoulder 475 faces in a direction opposite the end portion 380*a*. In some embodiments, the internal and external shoulders 475 and 470, respectively, are equally spaced from the end portion 380*a* (and the end portion 380*b*).

Figure 2H:
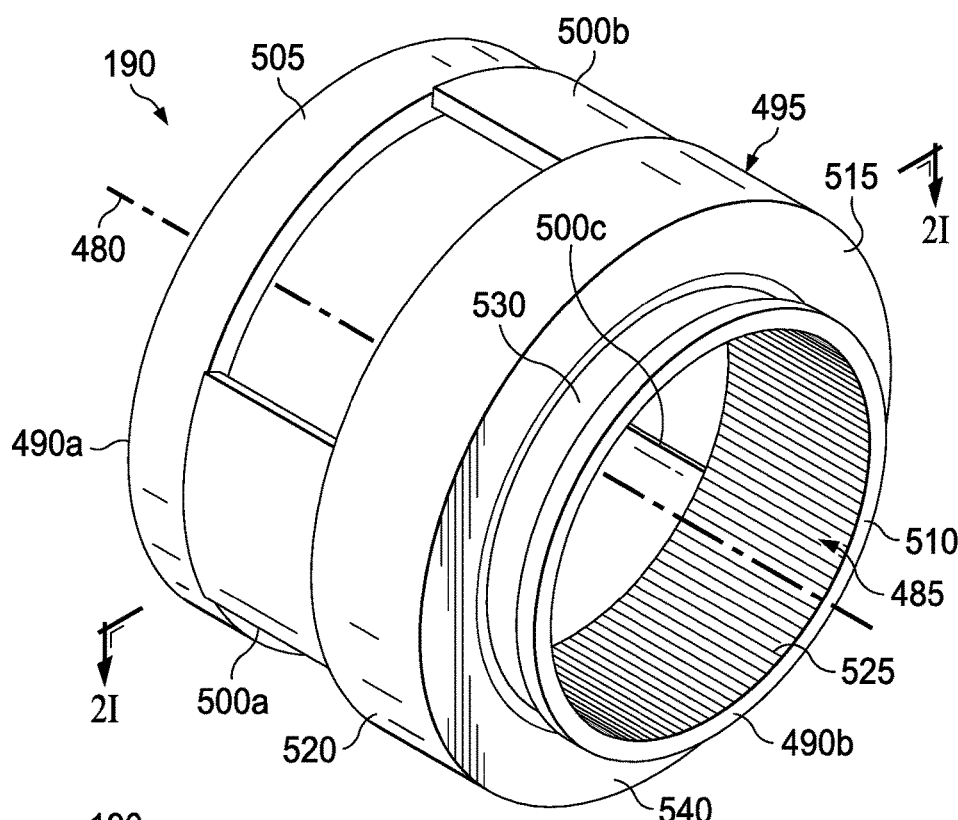
FIG. 2H is a perspective view of the third clutch sleeve of FIG. 2A, according to one or more embodiments of the present disclosure.
Figure 2I:
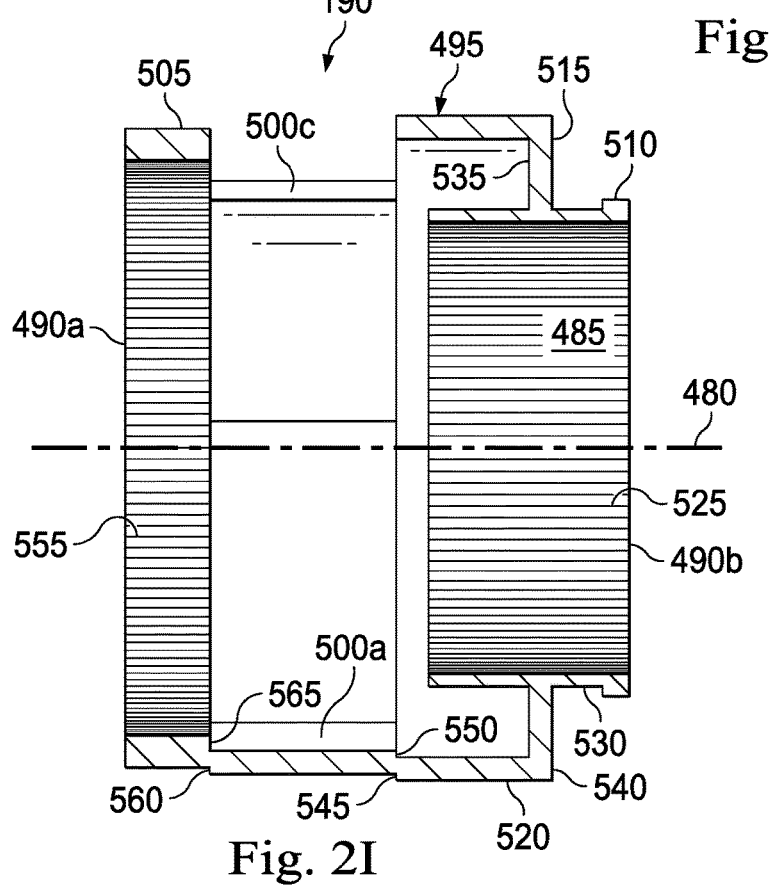
FIG. 2I is a cross-sectional view of the third clutch sleeve of FIG. 2H taken along the line 2I-2I of FIG. 2H, according to one or more embodiments of the present disclosure.

Turning to FIGS. 2H and 2I with continuing reference to FIG. 2A, in an embodiment, the clutch sleeve 190 is a generally tubular member extending along a longitudinal center axis 480 and defining an internal passage 485 and opposing end portions 490*a* and 490*b*. The clutch sleeve 190 includes a shift sleeve 495, fingers 500, and a dog clutch 505. The shift sleeve 495 includes wall segments 510, 515, and 520. The wall segment 510 extends circumferentially about the longitudinal center axis 480. The wall segment 510 includes an internal spline 525. The wall segment 510 is cylindrical. An external groove 530 is formed in the wall segment 510 proximate the end portion 490*b*. The external groove 530 is annular. The wall segment 515 extends circumferentially about the longitudinal center axis 480 and radially outwardly from the wall segment 510. The wall segment 515 is connected to the wall segment 510; for example, as in FIGS. 2H and 2I, the wall segment 515 may be connected directly to the wall segment 510. The wall segment 515 forms an internal shoulder 535 in the clutch sleeve 190. The internal shoulder 535 faces in a direction opposite the end portion 490*b*. In addition, the wall segment 515 forms an external shoulder 540 in the clutch sleeve 190. The external shoulder 540 faces in a direction opposite the end portion 490*a*. The external shoulder 540 is spaced relatively closer to the end portion 490*b* (and farther from the end portion 490*a*) than the internal shoulder 535. The wall segment 520 extends circumferentially about the longitudinal center axis 480. The wall segment 520 is connected to the wall segment 515 opposite the wall segment 510; for example, as in FIGS. 2H and 2I, the wall segment 520 may be connected directly to the wall segment 515. The wall segment 520 is cylindrical. The wall segment 520 extends past the internal shoulder 535 in a direction opposite the end portion 490*b*, but not past the external shoulder 540 in a direction opposite the end portion 490*a*.

In some embodiments, as in FIGS. 2H and 2I, the clutch sleeve 190 includes three of the fingers 500, as indicated by suffixes a, b, and c. The fingers 500*a*-*c* each extend in a direction parallel to the longitudinal center axis 480. The fingers 500*a*-*c* are connected to the wall segment 520 opposite the wall segment 515; for example, as in FIGS. 2H and 2I, the fingers 500*a*-*c* may be connected directly to the wall segment 520. The fingers 500*a*-*c* each extend arcuately from one to the other of two separate radii extending from the longitudinal center axis 480 and spaced apart by an angle a6. In some embodiments, the angle a6 by which the two separate radii are spaced apart is less than the third angle defined by each of the windows 220*a*-*c*. The fingers 500*a*-*c* are circumferentially spaced about the longitudinal center axis 480. In some embodiments, the fingers 500*a*-*c* are circumferentially spaced about the longitudinal center axis 480 at equal intervals (e.g., intervals of 120 degrees in the embodiment of FIGS. 2H and 2I). The wall segment 520 forms an external shoulder 545 in the clutch sleeve 190. The external shoulder 545 faces in a direction opposite the end portion 490*b*. In addition, the fingers 500*a*-*c* each form at least respective portions of an internal shoulder 550 in the clutch sleeve 190. The internal shoulder 550 faces in a direction opposite the end portion 490*a*. In some embodiments, the internal and external shoulders 550 and 545, respectively, are equally spaced from the end portion 490*a* (and the end portion 490*b*). Although shown in FIGS. 2H and 2I including three of the fingers 500, as indicated by the suffixes a, b, and c, the clutch sleeve 190 may instead include one, two, four, or more of the fingers 500.

The dog clutch 505 extends circumferentially about the longitudinal center axis 480. The dog clutch 505 is connected to the fingers 500*a*-*c* opposite the wall segment 520; for example, as in FIGS. 2H and 2I, the dog clutch 505 may be connected directly to the fingers 500*a*-*c*. The dog clutch 505 is cylindrical. The dog clutch 505 includes internal clutch teeth 555 proximate the end portion 490*a*. The fingers 500*a*-*c* each form at least respective portions of an external shoulder 560 in the clutch sleeve 190. The external shoulder 560 faces in a direction opposite the end portion 490*b*. In addition, the dog clutch 505 forms an internal shoulder 565 in the clutch sleeve 190. The internal shoulder 565 faces in a direction opposite the end portion 490*a*. In some embodiments, the internal and external shoulders 565 and 560, respectively, are equally spaced from the end portion 490*a* (and the end portion 490*b*).

Figure 2J:
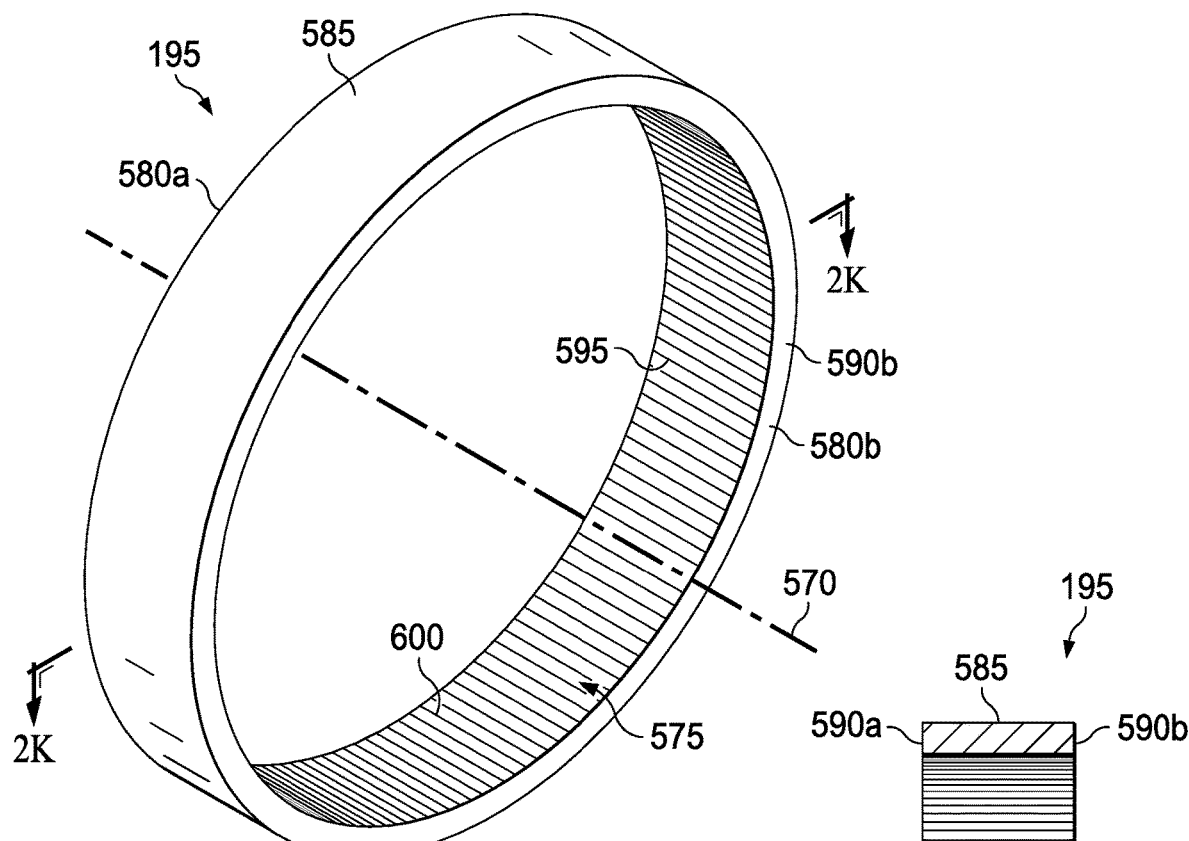
FIG. 2J is a perspective view of the fourth clutch sleeve of FIG. 2A, according to one or more embodiments of the present disclosure.
Figure 2K:
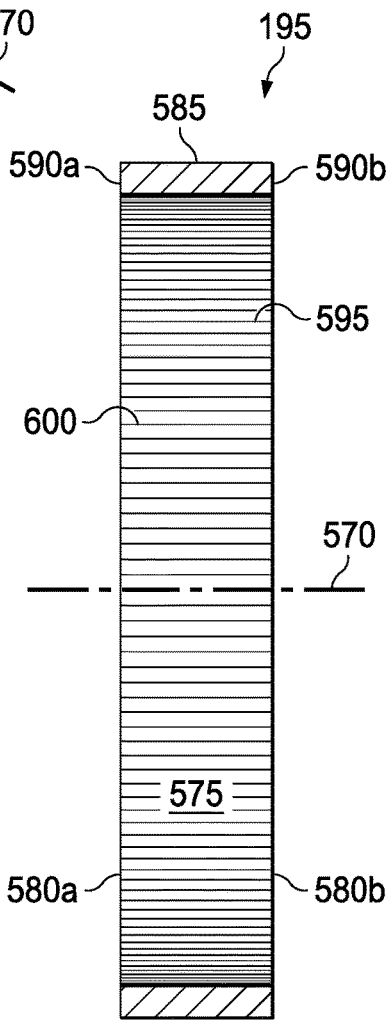
FIG. 2K is a cross-sectional view of the fourth clutch sleeve of FIG. 2J taken along the line 2K-2K of FIG. 2J, according to one or more embodiments of the present disclosure.

Turning to FIGS. 2J and 2K with continuing reference to FIG. 2A, in an embodiment, the clutch sleeve 195 is a generally tubular member extending along a longitudinal center axis 570 and defining an internal passage 575 and opposing end portions 580*a* and 580*b*. The clutch sleeve 195 includes a wall segment 585. The wall segment 585 extends circumferentially about the longitudinal center axis 570. The wall segment 585 includes opposing end faces 590*a* and 590*b*. The wall segment 585 includes an internal spline 595. The wall segment 585 is cylindrical. The wall segment 585 includes internal clutch teeth 600 proximate the end portion 580*a*. In some embodiments, the internal clutch teeth 600 include or are part of the internal spline 595.

Figure 2L:
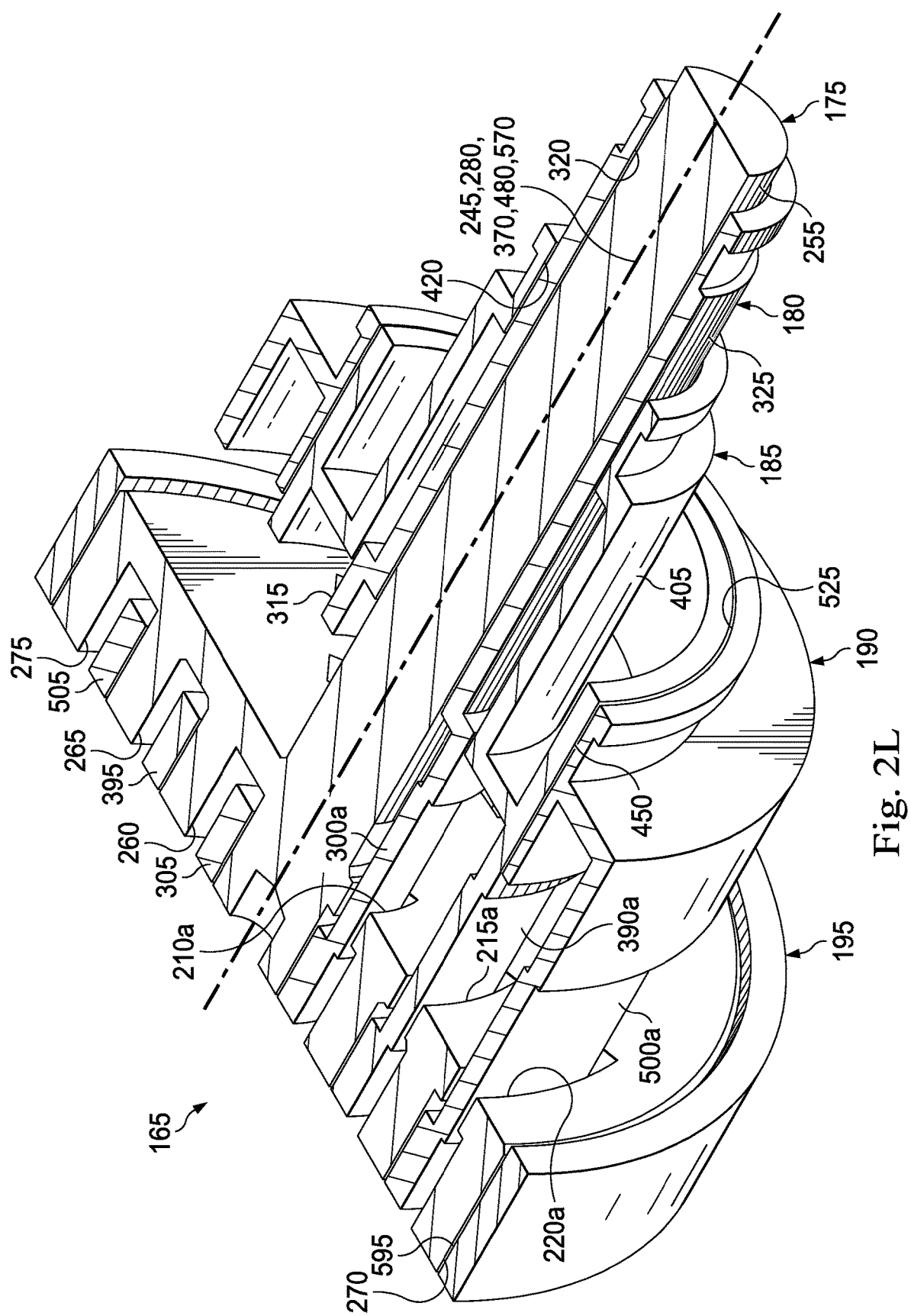
FIG. 2L is a perspective cross-sectional view of the clutch assembly of FIG. 2A in an assembled state, according to one or more embodiments of the present disclosure.

Referring to FIG. 2L, the clutch assembly 165 is shown in an assembled state, in which: the internal spline 320 of the clutch sleeve 180 is splined onto the external spline 255 of the clutch hub 175, the fingers 300*a*-*c* of the clutch sleeve 180 extend through the windows 210*a*-*c*, respectively, of the clutch hub 175, and the dog clutch 305 of the clutch sleeve 180 is extendable from, and retractable back into, the annulus 260 of the clutch hub 175; the internal spline 420 of the clutch sleeve 185 is splined onto the external spline 325 of the clutch sleeve 180 (and/or the internal spline of the wall segment 405 is splined onto the external spline of the wall segment 315), the fingers 390a-c of the clutch sleeve 185 extend through the windows 215a-c, respectively, of the clutch hub 175, and the dog clutch 395 of the clutch sleeve 185 is extendable from, and retractable back into, the annulus 265 of the clutch hub 175; the internal spline 525 of the clutch sleeve 190 is splined onto the external spline 450 of the clutch sleeve 185, the fingers 500a-c of the clutch sleeve 190 extend through the windows 220a-c, respectively, of the clutch hub 175, and the dog clutch 505 of the clutch sleeve 190 is extendable from, and retractable back into, the annulus 275 of the clutch hub 175; and the internal spline 595 of the clutch sleeve 195 is splined onto the external spline 270 of the clutch hub 175 so that the internal clutch teeth 600 are extendable from, and retractable back towards, the clutch hub 175.

In the assembled state of the clutch assembly 165: the longitudinal center axes 245, 280, 370, 480, 570 are coaxial; the clutch sleeve 180 is independently axially movable relative to the clutch hub 175 (and the clutch sleeves 185, 190, and 195) to extend the dog clutch 305 away from the clutch hub 175 (e.g., out of the annulus 260), and to retract the dog clutch 305 back towards the clutch hub 175 (e.g., back into the annulus 260); the clutch sleeve 185 is independently axially movable relative to the clutch hub 175 (and the clutch sleeves 180, 190, and 195) to extend the dog clutch 395 away from the clutch hub 175 (e.g., out of the annulus 265), and to retract the dog clutch 395 back towards the clutch hub 175 (e.g., back into the annulus 265); the clutch sleeve 190 is independently axially movable relative to the clutch hub 175 (and the clutch sleeves 180, 185, and 195) to extend the dog clutch 505 away from the clutch hub 175 (e.g., out of the annulus 265), and to retract the dog clutch 505 back towards the clutch hub 175 (e.g., back into the annulus 275); and the clutch sleeve 195 is independently axially movable relative to the clutch hub 175 (and the clutch sleeves 180, 185, and 190) to extend the internal clutch teeth 600 away from, and to retract the internal clutch teeth 600 back towards, the clutch hub 175.

Figure 3A:
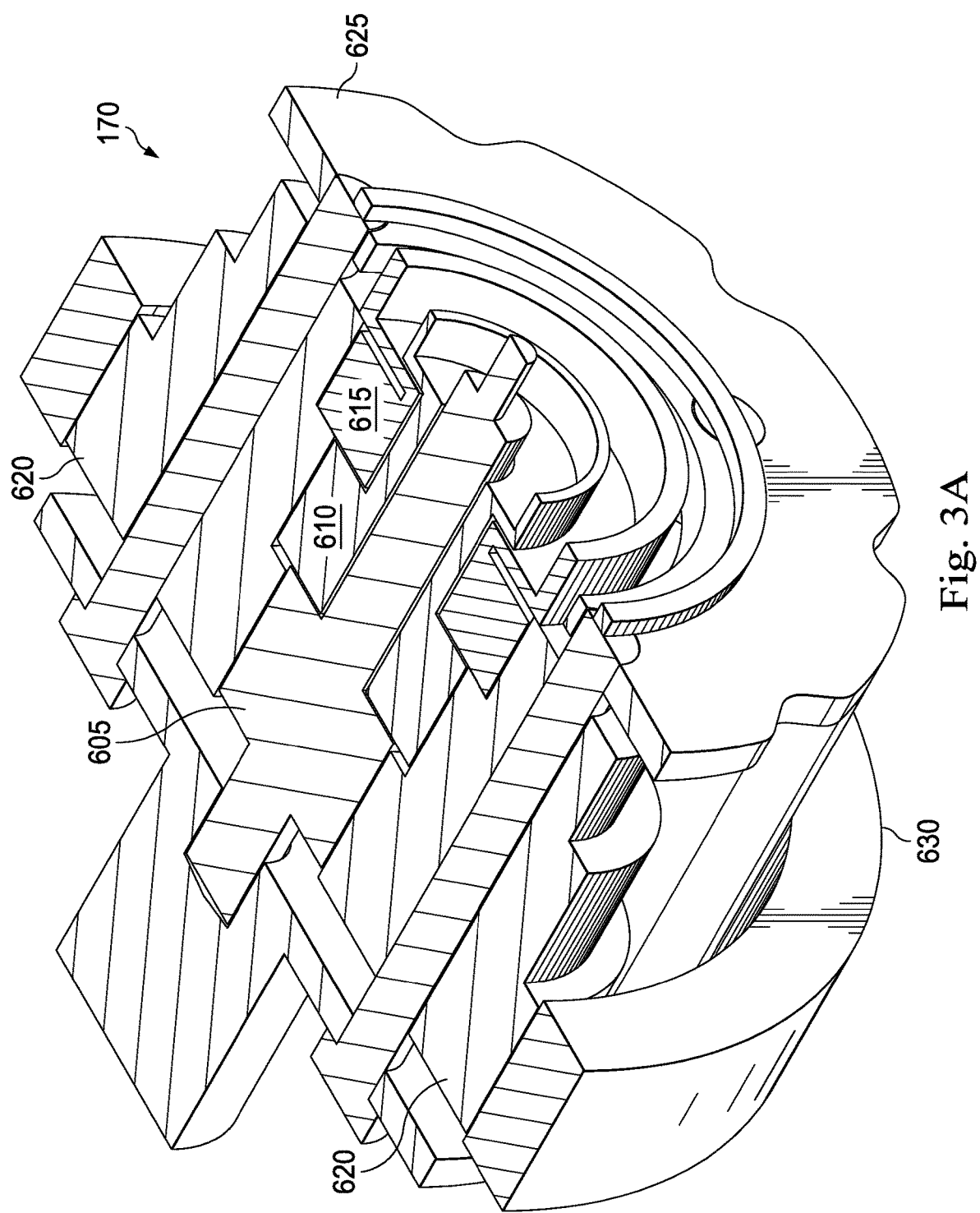
FIG. 3A is a perspective cross-sectional view of the planetary gear assembly of FIG. 1B, the planetary gear assembly including first, second, and third sun gears, planet gears, a planet carrier, and a ring gear, according to one or more embodiments of the present disclosure.
Figure 3B:
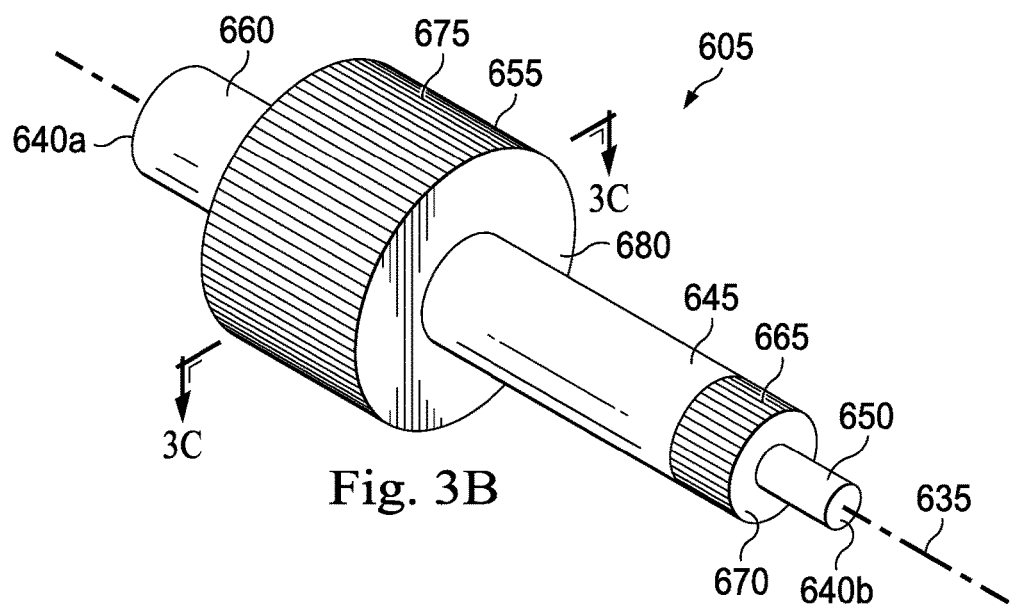
FIG. 3B is a perspective view of the first sun gear of FIG. 3A, according to one or more embodiments of the present disclosure.
Figure 3C:
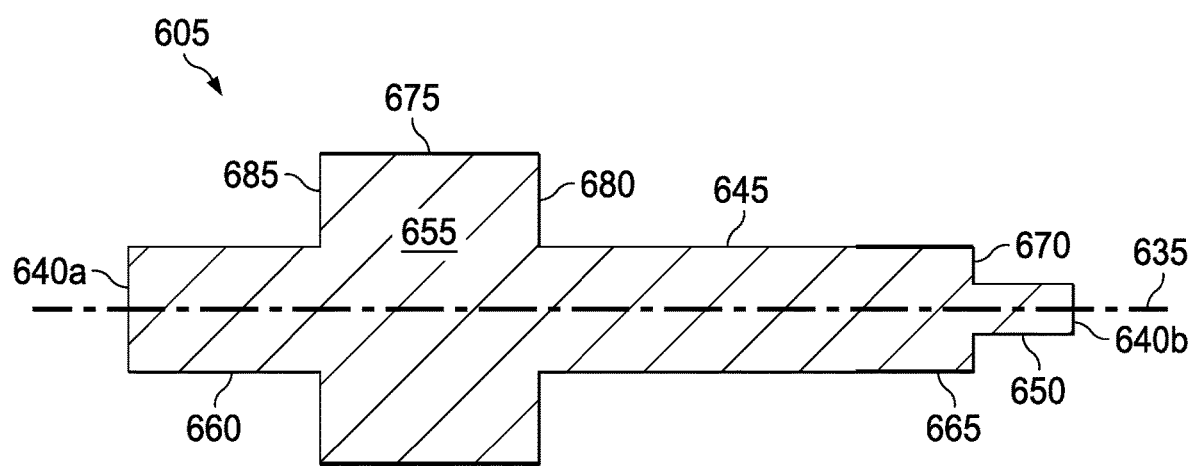
FIG. 3C is a cross-sectional view of the first sun gear of FIG. 3B taken along the line 3C-3C of FIG. 3B, according to one or more embodiments of the present disclosure.

Referring to FIG. 3A, in an embodiment, the planetary gear assembly 170 includes sun gears 605, 610, and 615, planet gears 620, a planet carrier 625, and a ring gear 630. Turning to FIGS. 3B and 3C with continuing reference to FIG. 3A, the sun gear 605 extends along a longitudinal center axis 635 and defines opposing end portions 640a and 640b. The sun gear 605 includes a shaft 645, a shaft support 650, a gear 655, and a gear support 660. The shaft 645 extends along the longitudinal center axis 635. The shaft 645 includes external clutch teeth 665 proximate the end portion 640b. The shaft 645 is cylindrical. The shaft support 650 is connected to the shaft 645 proximate the end portion 640b. The shaft support 650 extends along the longitudinal center axis 635. The shaft support 650 is cylindrical. The shaft 645 forms an external shoulder 670 in the sun gear 605 adjacent the shaft support 650. The external shoulder 670 faces in a direction opposite the end portion 640a. The gear 655 is connected to the shaft 645 proximate the end portion 640a. The gear 655 extends along the longitudinal center axis 635. The gear 655 is cylindrical. The gear 655 includes external gear teeth 675. The gear 655 forms an external shoulder 680 in the sun gear 605 adjacent the shaft 645. The external shoulder 680 faces in a direction opposite the end portion 640a. The gear support 660 is connected to the gear 655 opposite the shaft 645. The gear support 660 extends along the longitudinal center axis 635. The gear support 660 is cylindrical. The gear 655 forms an external shoulder 685 in the sun gear 605 adjacent the gear support 660. The external shoulder 685 faces in a direction opposite the end portion 640b.

Figure 3D:
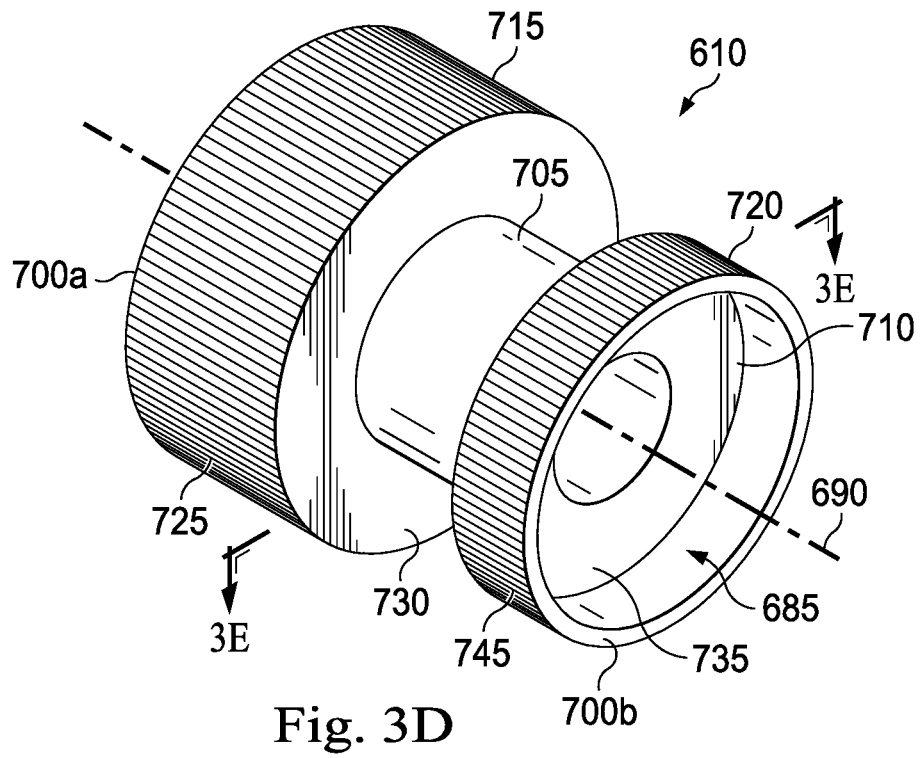
FIG. 3D is a perspective view of the second sun gear of FIG. 3A, according to one or more embodiments of the present disclosure.
Figure 3E:
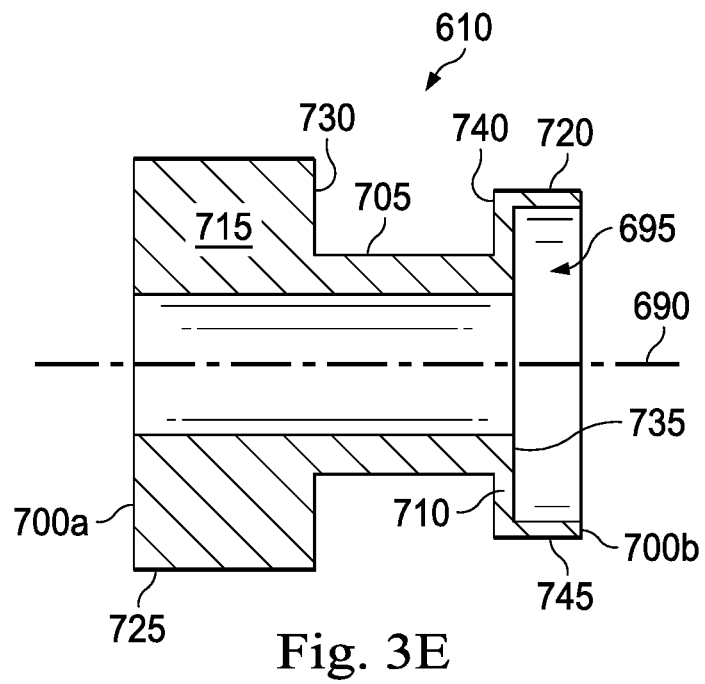
FIG. 3E is a cross-sectional view of the second sun gear of FIG. 3D taken along the line 3E-3E of FIG. 3D, according to one or more embodiments of the present disclosure.

Turning to FIGS. 3D and 3E, the sun gear 610 is a generally tubular member extending along a longitudinal center axis 690 and defining an internal passage 695 and opposing end portions 700a and 700b. The sun gear 610 includes wall segments 705 and 710, a gear 715, and a dog clutch 720. The wall segment 705 extends circumferentially about the longitudinal center axis 690. The wall segment 705 is cylindrical. The gear 715 extends circumferentially about the longitudinal center axis 690. The gear 715 is connected to the wall segment 705 proximate the end portion 700a; for example, as in FIGS. 3D and 3E, the gear 715 may be connected directly to the wall segment 705. The gear 715 is cylindrical. The gear includes external gear teeth 725. The gear 715 forms an external shoulder 730 in the sun gear 610 adjacent the wall segment 705. The external shoulder 730 faces in a direction opposite the end portion 700a. The wall segment 710 extends circumferentially about the longitudinal center axis 690 and radially outwardly from the wall segment 705. The wall segment 710 is connected to the wall segment 705 opposite the gear 715; for example, as in FIGS. 3D and 3E, the wall segment 710 may be connected directly to the wall segment 705. The wall segment 710 forms an internal shoulder 735 in the sun gear 610. The internal shoulder 735 faces in a direction opposite the end portion 700a. In addition, the wall segment 710 forms an external shoulder 740 in the sun gear 610. The external shoulder 740 faces in a direction opposite the end portion 700b. The external shoulder 740 is spaced relatively closer to the end portion 700a (and farther from the end portion 700a) than the internal shoulder 735. The dog clutch 720 extends circumferentially about the longitudinal center axis 690. The dog clutch 720 is connected to the wall segment 710 opposite the wall segment 705; for example, as in FIGS. 3D and 3E, the dog clutch 720 may be connected directly to the wall segment 710. The dog clutch 720 is cylindrical. The dog clutch 720 includes external clutch teeth 745 proximate the end portion 700b.

Figure 3F:
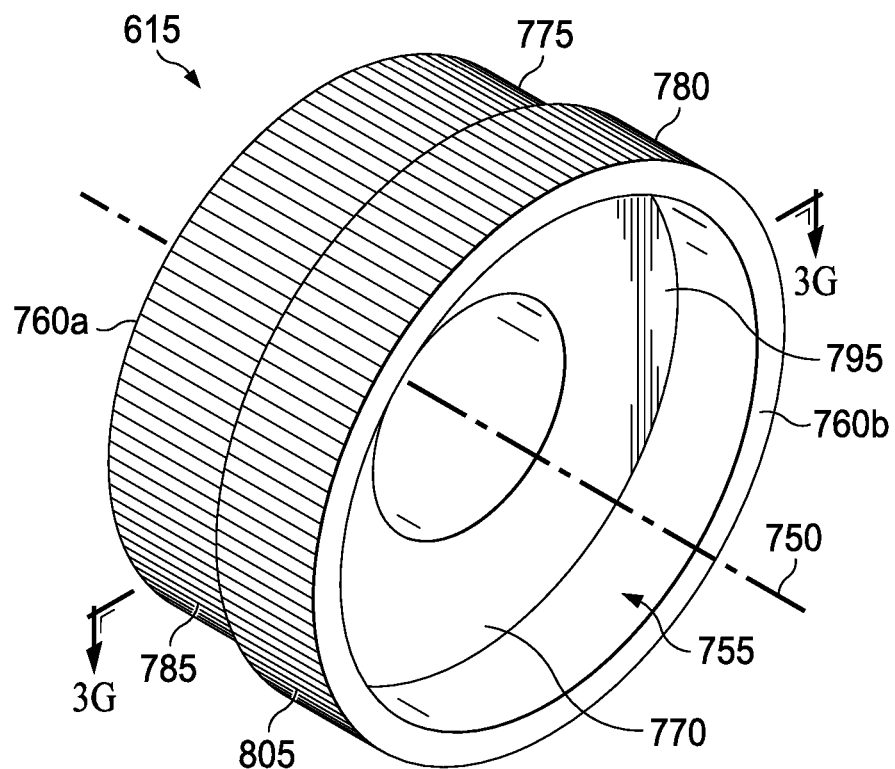
FIG. 3F is a perspective view of the third sun gear of FIG. 3A, according to one or more embodiments of the present disclosure.
Figure 3G:
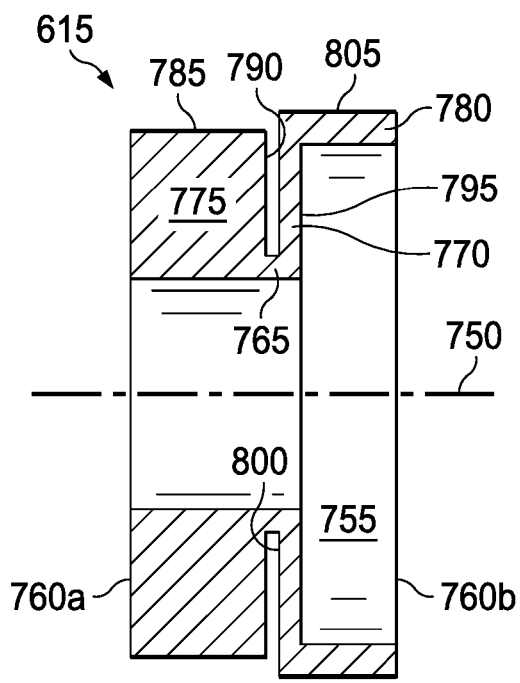
FIG. 3G is a cross-sectional view of the third sun gear of FIG. 3F taken along the line 3G-3G of FIG. 3F, according to one or more embodiments of the present disclosure.

Turning to FIGS. 3F and 3G with continuing reference to FIG. 3A, the sun gear 615 is a generally tubular member extending along a longitudinal center axis 750 and defining an internal passage 755 and opposing end portions 760a and 760b. The sun gear 615 includes wall segments 765 and 770, a gear 775, and a dog clutch 780. The wall segment 765 extends circumferentially about the longitudinal center axis 750. The wall segment 765 is cylindrical. The gear 775 extends circumferentially about the longitudinal center axis 750. The gear 775 is connected to the wall segment 765 proximate the end portion 760a; for example, as in FIGS. 3F and 3G, the gear 775 may be connected directly to the wall segment 765. The gear 775 is cylindrical. The gear includes external gear teeth 785. The gear 775 forms an external shoulder 790 in the sun gear 615 adjacent the wall segment 765. The external shoulder 790 faces in a direction opposite the end portion 760a. The wall segment 770 extends circumferentially about the longitudinal center axis 750 and radially outwardly from the wall segment 765. The wall segment 770 is connected to the wall segment 765 opposite the gear 775; for example, as in FIGS. 3F and 3G, the wall segment 770 may be connected directly to the wall segment 765. The wall segment 770 forms an internal shoulder 795 in the sun gear 615. The internal shoulder 795 faces in a direction opposite the end portion 760a. In addition, the wall segment 770 forms an external shoulder 800 in the sun gear 615. The external shoulder 800 faces in a direction opposite the end portion 760b. The external shoulder 800 is spaced relatively closer to the end portion 760a (and farther from the end portion 760a) than the internal shoulder 795. The dog clutch 780 extends circumferentially about the longitudinal center axis 750. The dog clutch 780 is connected to the wall segment 770 opposite the wall segment 765; for example, as in FIGS. 3F and 3G, the dog clutch 780 may be connected directly to the wall segment 770. The dog clutch 780 is cylindrical. The dog clutch 780 includes external clutch teeth 805 proximate the end portion 760b.

Figure 3H:
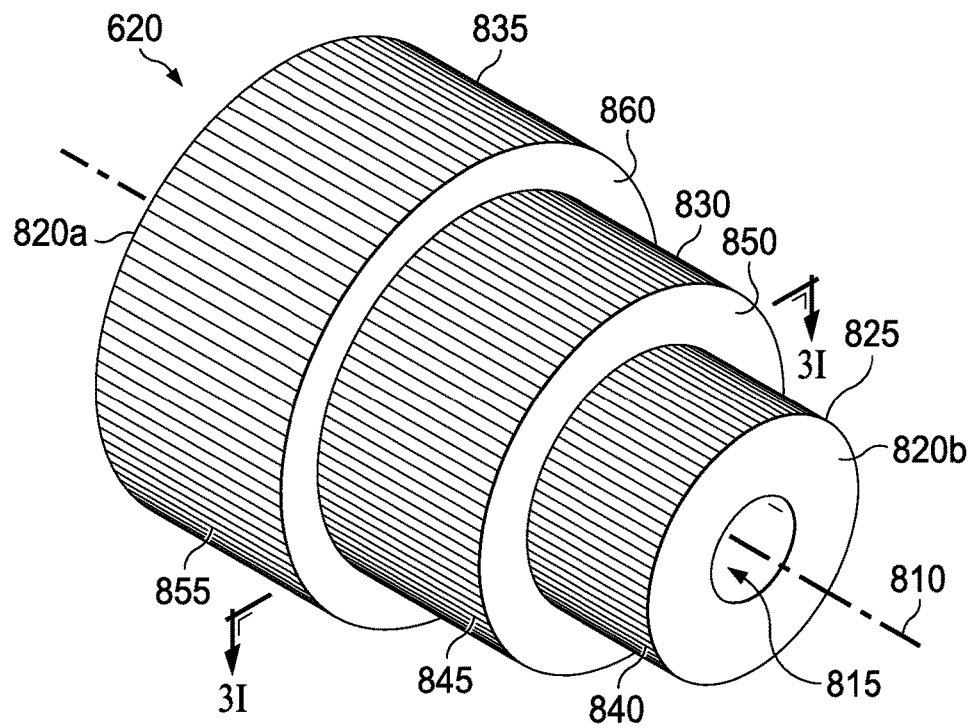
FIG. 3H is a perspective view of one of the planet gears of FIG. 3A, according to one or more embodiments of the present disclosure.
Figure 3I:
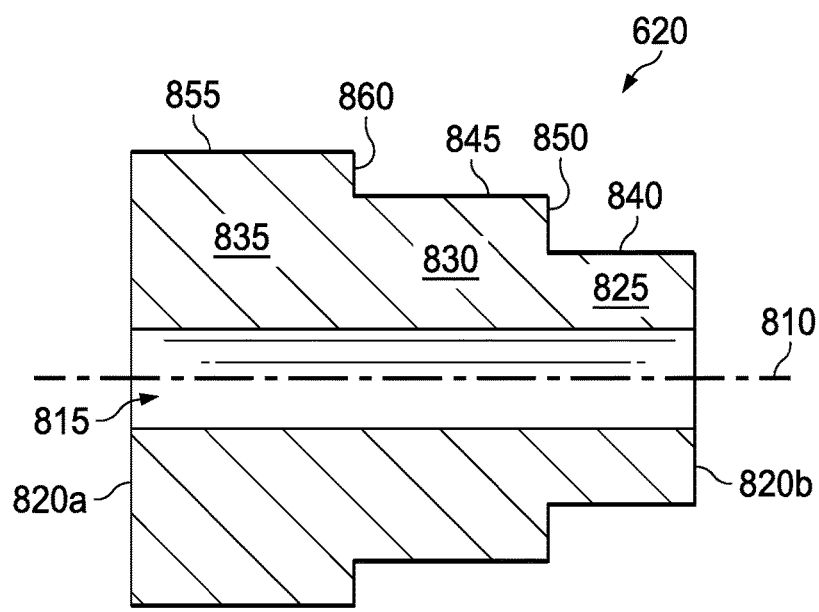
FIG. 3I is a cross-sectional view of the one of the planet gears of FIG. 3H taken along the line 3I-3I of FIG. 3H, according to one or more embodiments of the present disclosure.

Turning to FIGS. 3H and 3I with continuing reference to FIG. 3A, in an embodiment, each of the planet gears 620 is a generally tubular member extending along a longitudinal center axis 810 and defining an internal passage 815 and opposing end portions 820a and 820b. The planet gears 620 each include gears 825, 830, and 835. The gear 825 extends circumferentially about the longitudinal center axis 810 at the end portion 820b. The gear 825 is cylindrical. The gear 825 includes external gear teeth 840. The gear 830 is connected to the gear 825. The gear 830 extends circumferentially about the longitudinal center axis 810. The gear 830 is cylindrical. The gear 830 includes external gear teeth 845. The gear 830 forms an external shoulder 850 in the planet gear 620 adjacent the gear 825. The external shoulder 850 faces in a direction opposite the end portion 820a. The gear 835 is connected to the gear 830 opposite the gear 825. The gear 835 extends circumferentially about the longitudinal center axis 810 at the end portion 820a. The gear 835 is cylindrical. The gear 835 includes external gear teeth 855. The gear 835 forms an external shoulder 860 in the planet gear 620 adjacent the gear 830. The external shoulder 860 faces in a direction opposite the end portion 820a.

Figure 3J:
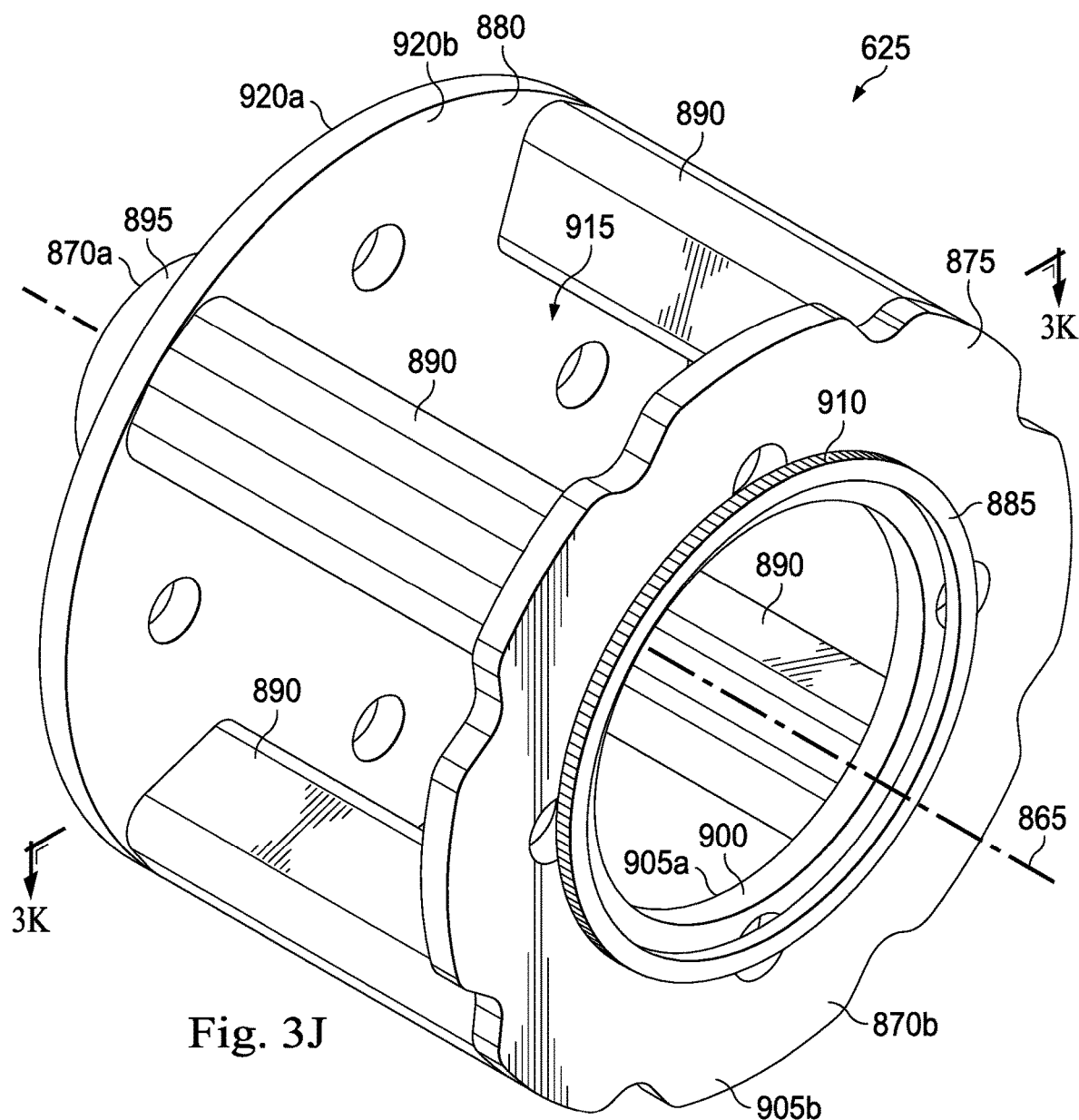
FIG. 3J is a perspective view of the planet carrier of FIG. 3A, according to one or more embodiments of the present disclosure.
Figure 3K:
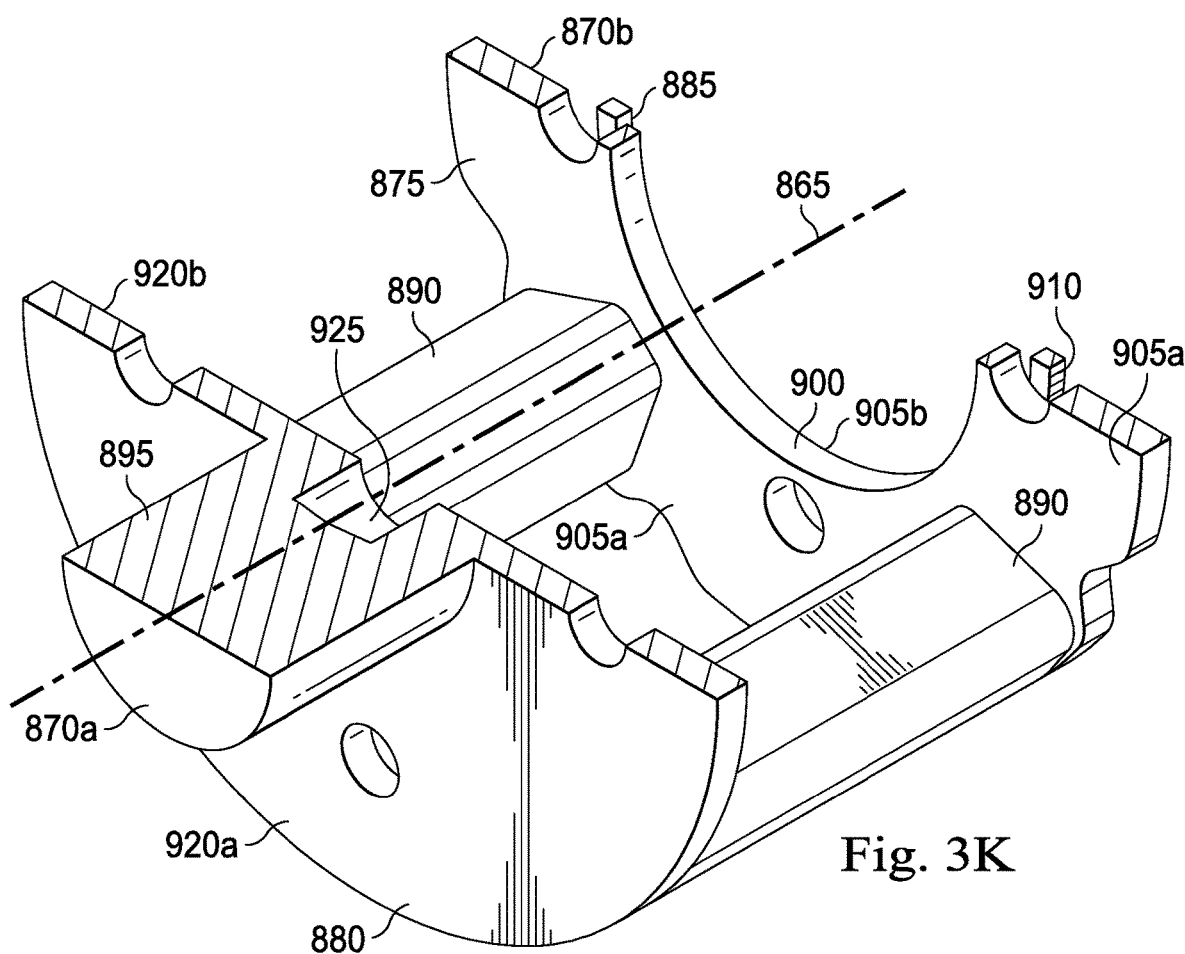
FIG. 3K is a perspective cross-sectional view of the planet carrier of FIG. 3J taken along the line 3K-3K of FIG. 3J, according to one or more embodiments of the present disclosure.

Turning to FIGS. 3J and 3K with continuing reference to FIG. 3A, in an embodiment, the planet carrier 625 extends along a longitudinal center axis 865 and defines opposing end portions 870a and 870b. The planet carrier 625 includes plates 875 and 880, a dog clutch 885, plate connectors 890, and an output shaft 895. The plate 875 extends circumferentially about the longitudinal center axis 865 and defines a central opening 900 and opposing sides 905a and 905b. The central opening 900 is formed through the plate 875 along the longitudinal center axis 865. The dog clutch 885 is connected to the side 905b of the plate 875 at the end portion 870b. The dog clutch 885 extends circumferentially about the longitudinal center axis 865. The dog clutch 885 is cylindrical. The dog clutch 885 includes external clutch teeth 910. The plate connectors 890 connect the plate 880 to the plate 875. As a result, the planet carrier 625 defines an internal region 915 interior to the plate connectors 890 and between the plates 875 and 880. The plate connectors 890 are connected to the plate 875 at the side 905a. In some embodiments, as in FIGS. 3J and 3K, the planet carrier 625 includes four of the plate connectors 890, as indicated by suffixes a, b, c, and d. The plate connectors 890a-d each extend from the plate 875 to the plate 880, or vice versa, in a direction parallel to the longitudinal center axis 865. The plate connectors 890a-d are circumferentially spaced about the longitudinal center axis 865. In some embodiments, the plate connectors 890a-d are circumferentially spaced about the longitudinal center axis 865 at equal intervals (e.g., intervals of 90 degrees in the embodiment of FIGS. 3J and 3K). Although shown in FIGS. 3J and 3K including four of the plate connectors 890, as indicated by the suffixes a, b, c, and d, the planet carrier 625 may instead include one, two, three, five, or more of the plate connectors 890. The plate 880 extends circumferentially about the longitudinal center axis 865 and defines opposing sides 920a and 920b. The plate connectors 890 are connected to the plate 880 at the side 920b. The output shaft 895 is connected to the side 920a of the plate 880 at the end portion 870a. The output shaft 895 extends along the longitudinal center axis 865. The output shaft 895 is cylindrical. A blind hole 925 is formed into the side 920b of the plate 880. The blind hole 925 is formed into the plate 880 along the longitudinal center axis 865. In some embodiments, the blind hole 925 extends through the plate 880 and into the output shaft 895.

Figure 3L:
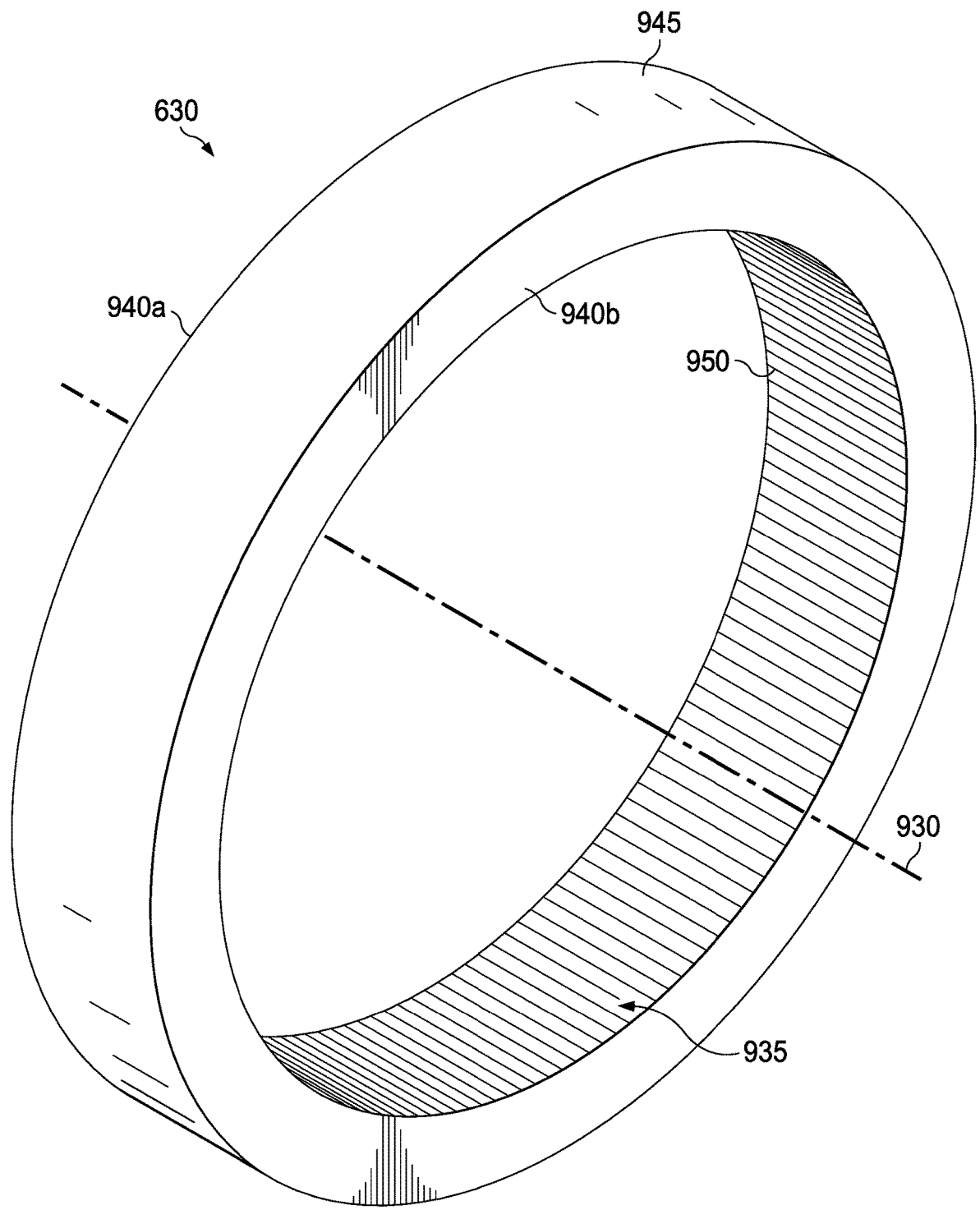
FIG. 3L is a perspective view of the ring gear of FIG. 3A, according to one or more embodiments of the present disclosure.

Turning to FIG. 3L with continuing reference to FIG. 3A, in an embodiment, the ring gear 630 is a generally tubular member extending along a longitudinal center axis 930 and defining an internal passage 935 and opposing end portions 940a and 940b. The ring gear 630 includes a wall segment 945. The wall segment 945 extends circumferentially about the longitudinal center axis 930. The wall segment 945 is cylindrical. The wall segment 945 includes internal gear teeth 950.

Figure 4A:
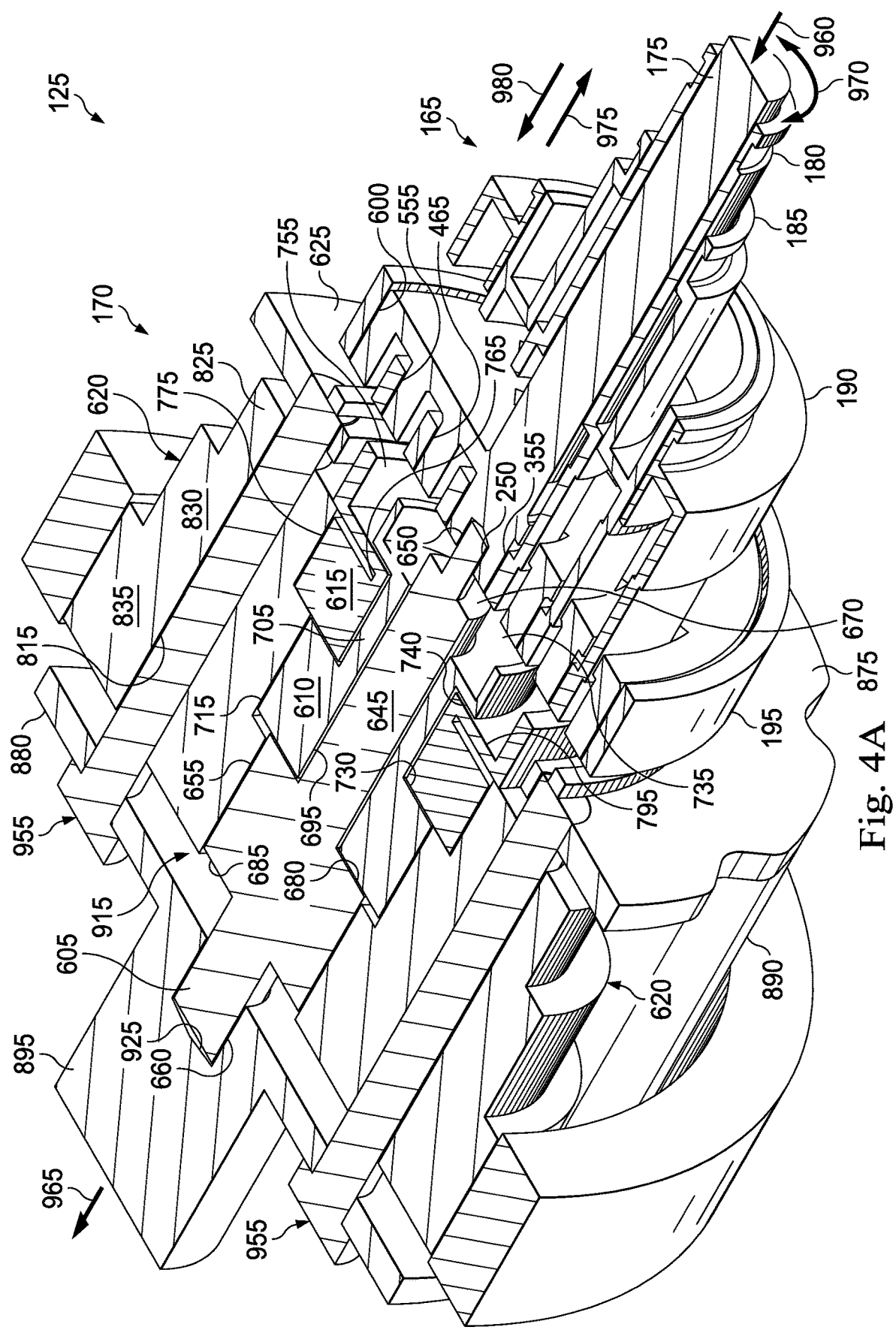
FIG. 4A is a perspective cross-sectional view of the transmission apparatus of FIG. 1B in a first operational configuration, according to one or more embodiments of the present disclosure.

Referring to FIG. 4A, the planetary gear assembly 170 is shown adjacent the clutch assembly 165 in an assembled state, in which the sun gears 605, 610, and 615 extend within the internal region 915 of the planet carrier 625. The shaft 645 of the sun gear 605 extends within the internal passage 695 of the sun gear 610 so that the external shoulder 680 of the sun gear 605 extends adjacent the gear 715 of the sun gear 610. Further, the wall segment 705 of the sun gear 610 extends within the internal passage 755 of the sun gear 615 so that the external shoulders 730 and 740 of the sun gear 610 extend adjacent the gear 775 and the internal shoulder 795, respectively, of the sun gear 615. Further still, the planet gears 620 are interposed between the plate connectors 890 and circumferentially about the sun gears 605, 610, and 615. More particularly, support pins 955 extend from the plate 875 to the plate 880 through the respective internal passages 815 of the planet gears 620 to support the planet gears 620 in a rotatable manner so that: the respective gears 835 of the planet gears 620 are engaged with the gear 655 of the sun gear 605, the respective gears 830 of the planet gears 620 are engaged with the gear 715 of the sun gear 610, and the respective gears 825 of the planet gears 620 are engaged with the gear 775 of the sun gear 615.

One or more bushings (or other types of radial bearings) may be positioned between the wall segment 705 and the shaft 645 and/or between the wall segment 765 and the wall segment 705 to ease relative rotation between the sun gears 605, 610, and 615. Additional bushings (or other types of radial bearings) may be positioned in the blind hole 250 between the shaft support 650 and the clutch hub 175 and/or in the blind hole 925 between the gear support 660 and the planet carrier 625. Similarly, one or more thrust bearings may be positioned between the external shoulder 680 and the gear 715, between the external shoulder 730 and the gear 775, and/or between the external shoulder 740 and the internal shoulder 795 to permit relative rotation between the sun gears 605, 610, and 615 while preventing, or at least reducing, relative axial movement between the sun gears 605, 610 and 615. Additional thrust bearings may be positioned between the internal shoulder 735 and a snap ring (or another fastener) connected to the shaft 645, between the external shoulder 670 and the clutch hub 175 proximate the blind hole 250, and/or between the external shoulder 685 and the planet carrier 625 proximate the blind hole 925.

Turning additionally to FIGS. 4B-E with continuing reference to FIG. 4A, in an assembled state of the transmission apparatus 125, the motor 120 is operably coupled to the input shaft 200 of the clutch assembly 165, as indicated by arrow 960, and the drive shaft 130 is operably coupled to the output shaft 895 of the planetary gear assembly 170, as indicated by arrow 965. In operation, the transmission apparatus 125 is actuable to a first configuration in which the transmission apparatus 125 does not transmit rotational output produced by the motor 120 and indicated by arrow 970 to the drive shaft 130. In addition, the transmission apparatus 125 is actuable to second, third, fourth, and fifth configurations in which the transmission apparatus 125 does transmit the rotational output 970 produced by the motor 120 to the drive shaft 130 (at different gear ratios). The first configuration of the transmission apparatus 125 is shown in FIG. 4A and may be referred to herein as "neutral". In neutral, the respective clutch sleeves 180, 185, 190, and 195 are retracted towards the clutch hub 175 in a direction 975 so that the internal clutch teeth 355, 465, 555, and 600 are disengaged from the planetary gear assembly 170. As a result, the rotational output 970 produced by the motor 120 is not transmitted from the clutch assembly 165 to the planetary gear assembly 170.

Figure 4B:
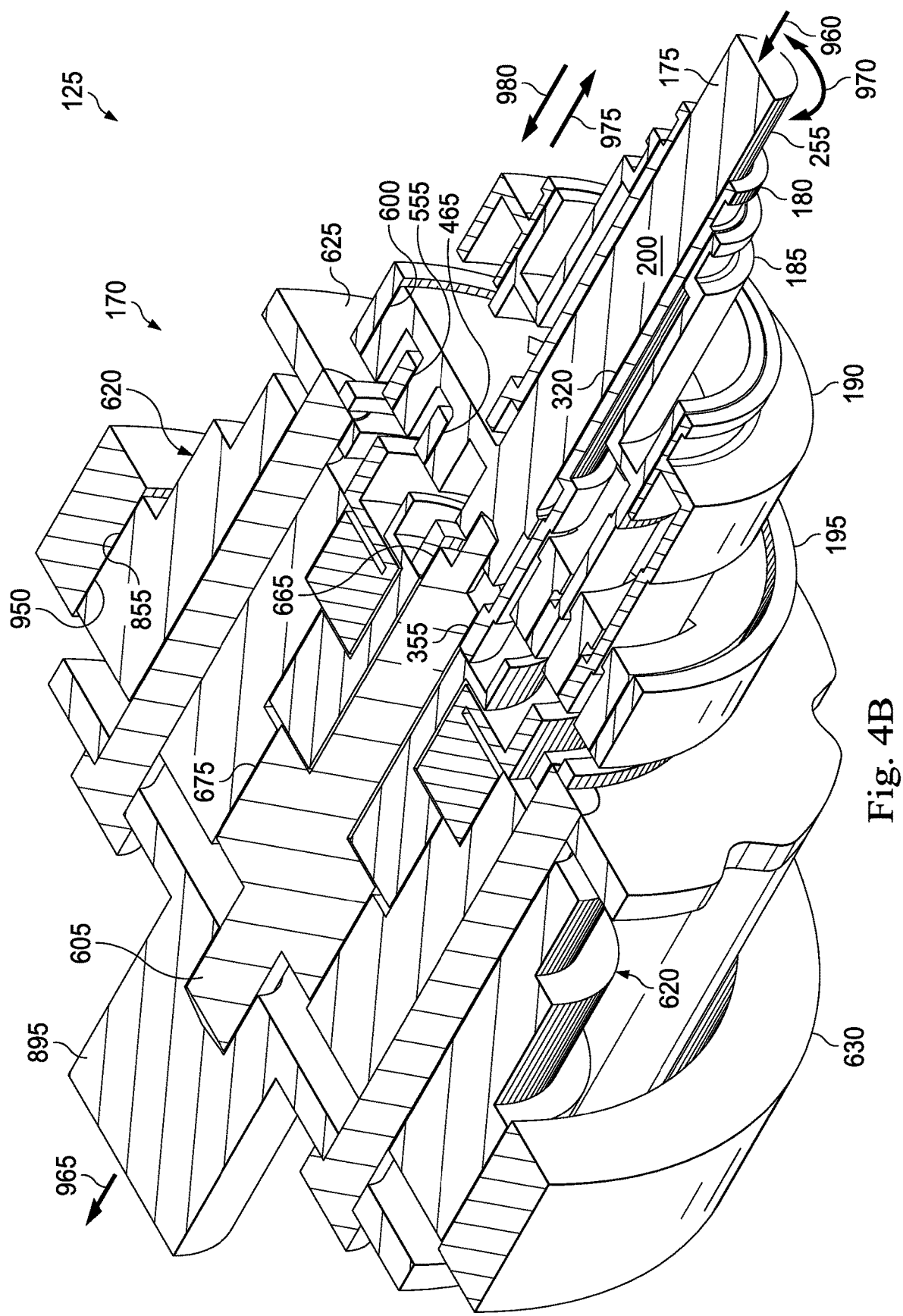
FIG. 4B is a perspective cross-sectional view of the transmission apparatus of FIG. 1B in a second operational configuration, according to one or more embodiments of the present disclosure.

The second configuration of the transmission apparatus 125 is shown in FIG. 4B and may be referred to herein as "first gear". In first gear, the clutch sleeve 180 is extended away from the clutch hub 175 in a direction 980, which is opposite the direction 975, so that the internal clutch teeth 355 of the clutch sleeve 180 engage the external clutch teeth 665 of the sun gear 605. At the same time, the respective clutch sleeves 185, 190, and 195 are (or remain) retracted towards the clutch hub 175 in the direction 975 so that the internal clutch teeth 465, 555, and 600 are disengaged from the planetary gear assembly 170. In operation, when the transmission apparatus 125 is in first gear, the rotational output 970 produced by the motor 120 is transmitted: from the clutch hub 175 to the clutch sleeve 180 via engagement between the external and internal splines 255 and 320, respectively; from the clutch sleeve 180 to the sun gear 605 via engagement between the internal and external clutch teeth 355 and 665, respectively; from the sun gear 605 to the planet gears 620 via engagement between the external gear teeth 675 and 855 (at a gear ratio of $y_1/x_1$, where $y_1$ is the # of external gear teeth 855 and $x_1$ is the # of external gear teeth 675); and from the planet gears 620 to the ring gear 630 via engagement between the external and internal gear teeth 855 and 950, respectively (at a gear ratio of $z_1/y_1$, where $z_1$ is the # of internal gear teeth 950). The ring gear 630 is held stationary so that the rotational output 970 produced by the motor 120 causes the planet gears 620 to orbit around the sun gear 605. As a result, a gear ratio of $z_1/x_1$ between the input shaft 200 and the planet carrier 625 causes the output shaft 895 to rotate slower than the input shaft 200.

Figure 4C:
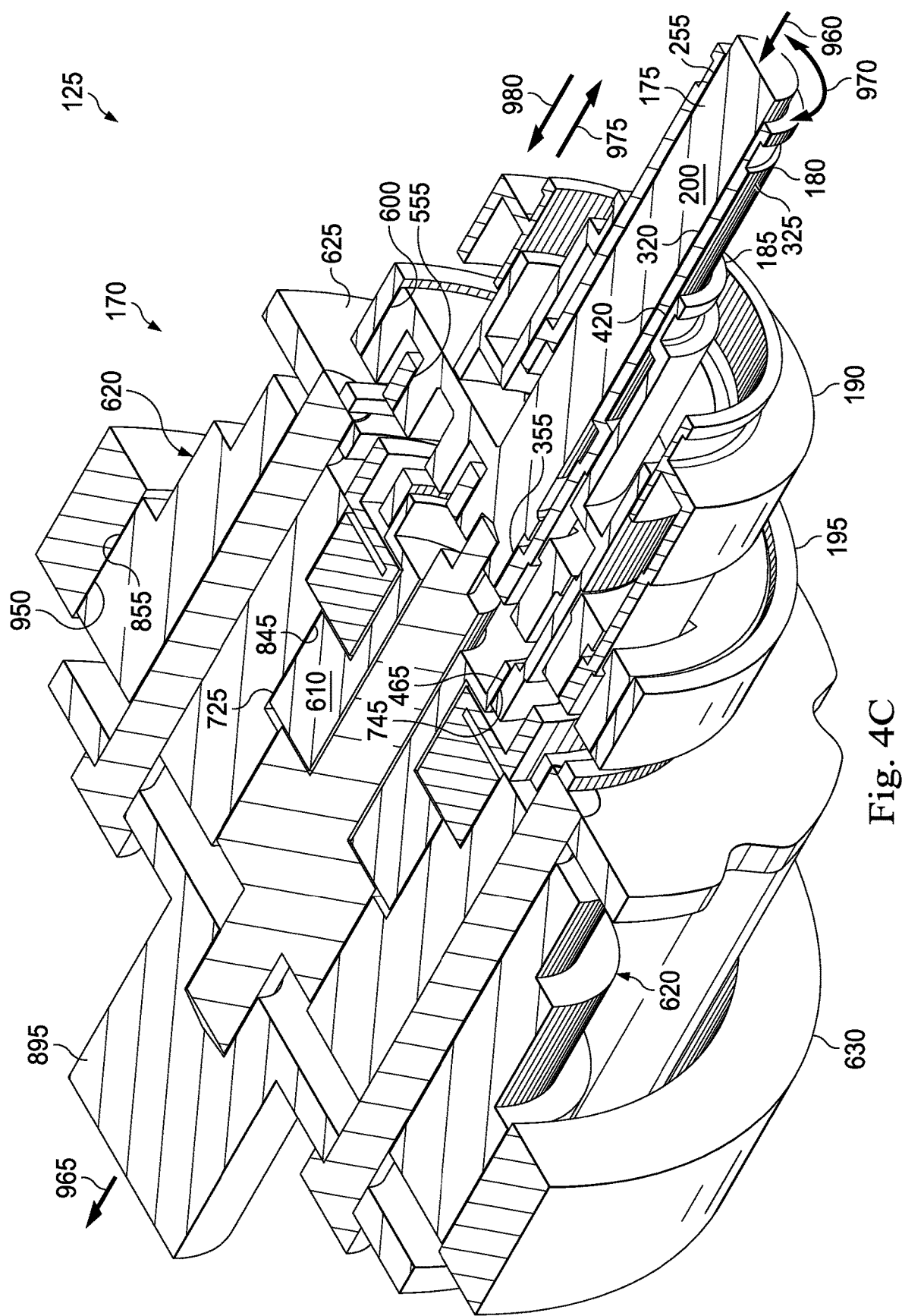
FIG. 4C is a perspective cross-sectional view of the transmission apparatus of FIG. 1B in a third operational configuration, according to one or more embodiments of the present disclosure.

The third configuration of the transmission apparatus 125 is shown in FIG. 4C and may be referred to herein as "second gear". In second gear, the clutch sleeve 185 is extended away from the clutch hub 175 in the direction 980 so that the internal clutch teeth 465 of the clutch sleeve 185 engage the external clutch teeth 745 of the sun gear 610. At the same time, the respective clutch sleeves 180, 190, and 195 are (or remain) retracted towards the clutch hub 175 in the direction 975 so that the internal clutch teeth 355, 555, and 600 are disengaged from the planetary gear assembly 170. In operation, when the transmission apparatus 125 is in second gear, the rotational output 970 produced by the motor 120 is transmitted: from the clutch hub 175 to the clutch sleeve 180 via engagement between the external and internal splines 255 and 320, respectively; from the clutch sleeve 180 to the clutch sleeve 185 via engagement between the external and internal splines 325 and 420, respectively; from the clutch sleeve 185 to the sun gear 610 via engagement between the internal and external clutch teeth 465 and 745, respectively; from the sun gear 610 to the planet gears 620 via engagement between the external gear teeth 725 and 845 (at a gear ratio of $y_2/x_2$, where $y_2$ is the # of external gear teeth 845 and $x_2$ is the # of external gear teeth 725); and from the planet gears 620 to the ring gear 630 via engagement between the external and internal gear teeth 855 and 950, respectively (at a gear ratio of $z_1/y_1$). The ring gear 630 is held stationary so that the rotational output 970 produced by the motor 120 causes the planet gears 620 to orbit around the sun gear 610. As a result, a gear ratio of $(y_2/x_2)*(z_1/y_1)$ between the input shaft 200 and the planet carrier 625 causes the output shaft 895 to rotate slower than the input shaft 200.

Figure 4D:
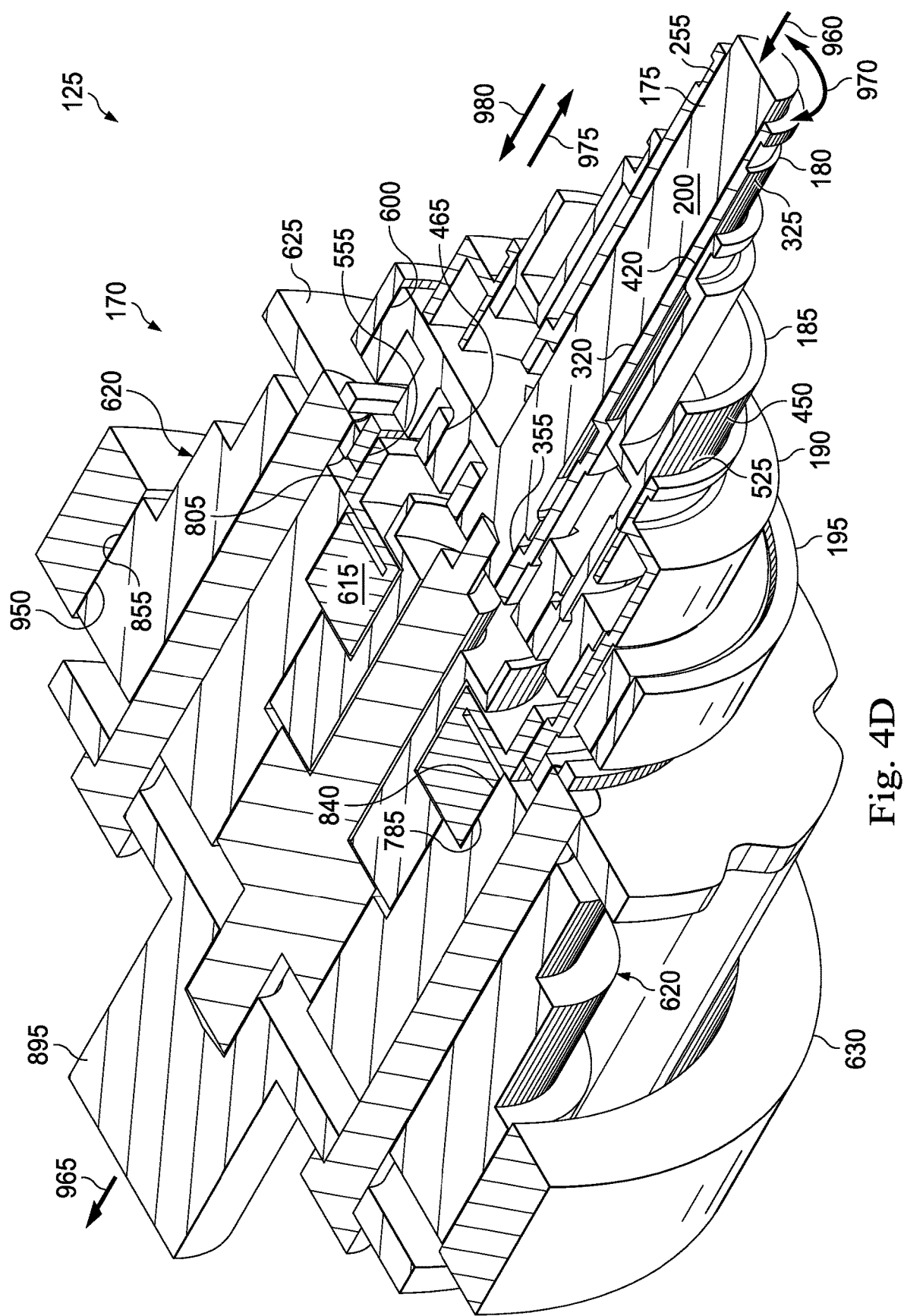
FIG. 4D is a perspective cross-sectional view of the transmission apparatus of FIG. 1B in a fourth operational configuration, according to one or more embodiments of the present disclosure.

The fourth configuration of the transmission apparatus 125 is shown in FIG. 4D and may be referred to herein as "third gear". In third gear, the clutch sleeve 190 is extended away from the clutch hub 175 in the direction 980 so that the internal clutch teeth 555 of the clutch sleeve 190 engage the external clutch teeth 805 of the sun gear 615. At the same time, the respective clutch sleeves 180, 185, and 195 are (or remain) retracted towards the clutch hub 175 in the direction 975 so that the internal clutch teeth 355, 465, and 600 are disengaged from the planetary gear assembly 170. In operation, when the transmission apparatus 125 is in third gear, the rotational output 970 produced by the motor 120 is transmitted: from the clutch hub 175 to the clutch sleeve 180 via engagement between the external and internal splines 255 and 320, respectively; from the clutch sleeve 180 to the clutch sleeve 185 via engagement between the external and internal splines 325 and 420, respectively; from the clutch sleeve 185 to the clutch sleeve 190 via engagement between the external and internal splines 450 and 525, respectively; from the clutch sleeve 190 to the sun gear 615 via engagement between the internal and external clutch teeth 555 and 805, respectively; from the sun gear 615 to the planet gears 620 via engagement between the external gear teeth 785 and 840 (at a gear ratio of $y_3/x_3$, where $y_3$ is the # of external gear teeth 840 and $x_3$ is the # of external gear teeth 785); and from the planet gears 620 to the ring gear 630 via engagement between the external and internal gear teeth 855 and 950, respectively (at a gear ratio of $z_1/y_1$). The ring gear 630 is held stationary so that the rotational output 970 produced by the motor 120 causes the planet gears 620 to orbit around the sun gear 615. As a result, a gear ratio of $(y_3/x_3)*(z_1/y_1)$ between the input shaft 200 and the planet carrier 625 causes the output shaft 895 to rotate slower than the input shaft 200.

Figure 4E:
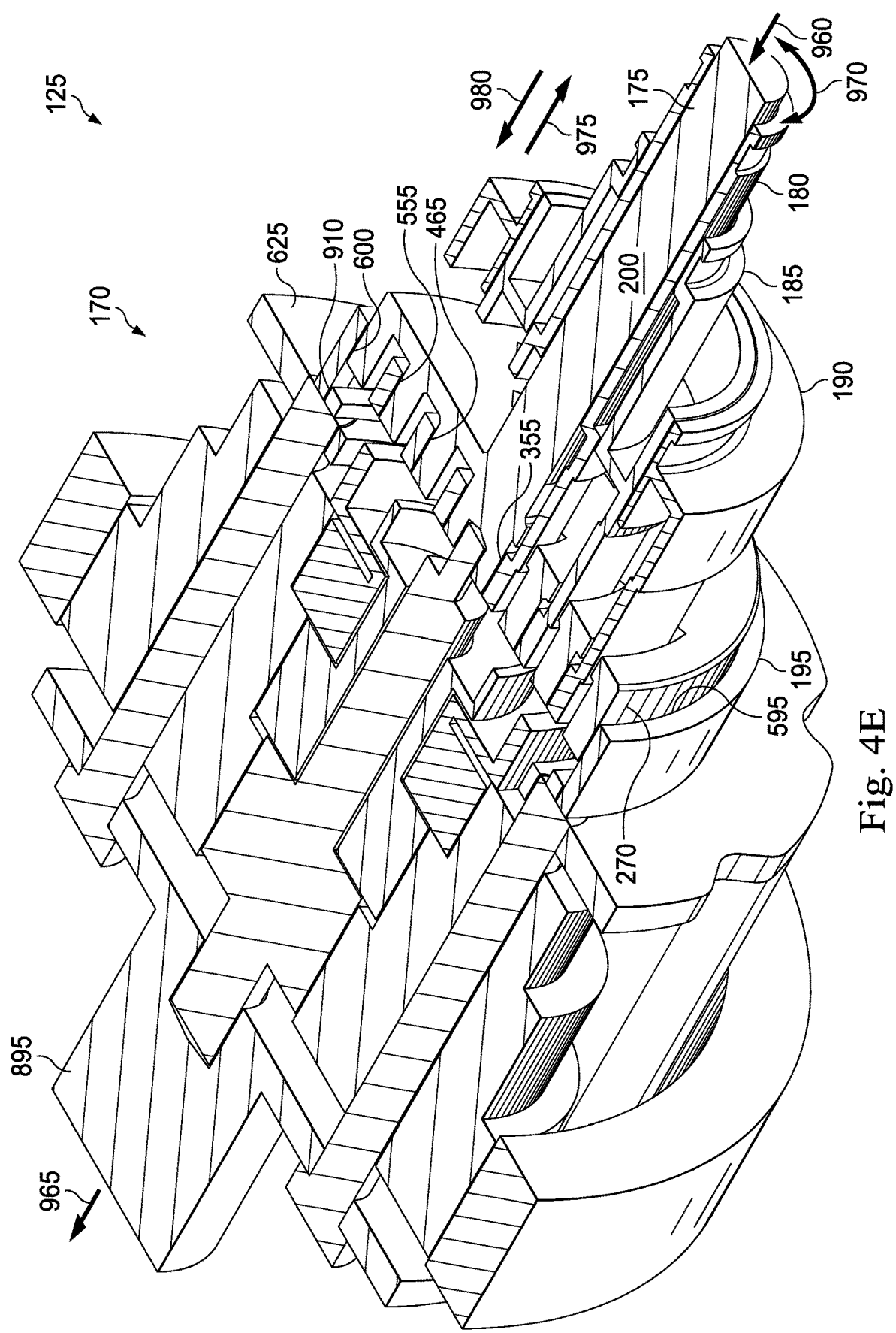
FIG. 4E is a perspective cross-sectional view of the transmission apparatus of FIG. 1B in a fifth operational configuration, according to one or more embodiments of the present disclosure.

The fifth configuration of the transmission apparatus 125 is shown in FIG. 4E and may be referred to herein as "fourth gear". In fourth gear, the clutch sleeve 195 is extended away from the clutch hub 175 in the direction 980 so that the internal clutch teeth 600 of the clutch sleeve 195 engage the external clutch teeth 910 of the planet carrier 625. At the same time, the respective clutch sleeves 180, 185, and 190 are (or remain) retracted towards the clutch hub 175 in the direction 975 so that the internal clutch teeth 355, 465, and 555 are disengaged from the planetary gear assembly 170. In operation, when the transmission apparatus 125 is in fourth gear, the rotational output 970 produced by the motor 120 is transmitted: from the clutch hub 175 to the clutch sleeve 195 via engagement between the external and internal splines 270 and 595, respectively; and from the clutch sleeve 195 to the planet carrier 625 via engagement between the internal and external clutch teeth 600 and 910, respectively. As a result, the rotational output 970 produced by the motor 120 causes the output shaft 895 to rotate at the same speed as the input shaft 200.

During operation, the gear selector 155 is engaged with the clutch sleeves 180, 185, and 190 at the external grooves 330, 425, 530, respectively, so that, when the vehicle 105 is shifted into first, second, or third gear, the gear selector 155 shifts the corresponding clutch sleeve 180, 185, or 190 in the direction 980 to engage the planetary gear assembly 170, as described above. The gear selector 155 is also engaged with the clutch sleeve 195 so that, when the vehicle 105 is shifted into fourth gear, the gear selector 155 shifts the clutch sleeve 195 in the direction 980 to engage the planetary gear assembly 170, as described above. Additionally, the gear selector 155 is configured so that, during the process of shifting from any one to another of the first, second, third, and fourth gears, the transmission apparatus 125 must be shifted into neutral before shifting into the next gear (e.g., from first gear into neutral before shifting into second gear). Thus, in some embodiments, during the shifting process, after the transmission apparatus 125 is shifted into neutral but before shifting into the next gear, the control unit 115 controls the motor 120 based on at least the detected position of the transmission apparatus 125, the detected rotational speed of the motor 120's output (e.g., at the input shaft 200), and the detected rotational speed of the transmission apparatus 125's output (e.g., at the output shaft 895) so that: the rotational speed of the clutch sleeve 180 is within a predetermined range of the rotational speed of the sun gear 605 (to facilitate smoother shifting into first gear); the rotational speed of the clutch sleeve 185 is within a predetermined range of the rotational speed of the sun gear 610 (to facilitate smoother shifting into second gear); the rotational speed of the clutch sleeve 190 is within a predetermined range of the rotational speed of the sun gear 615 (to facilitate smoother shifting into third gear); or the rotational speed of the clutch sleeve 195 is within a predetermined range of the rotational speed of the planet carrier 625 (to facilitate smoother shifting into fourth gear).

Figure 5:
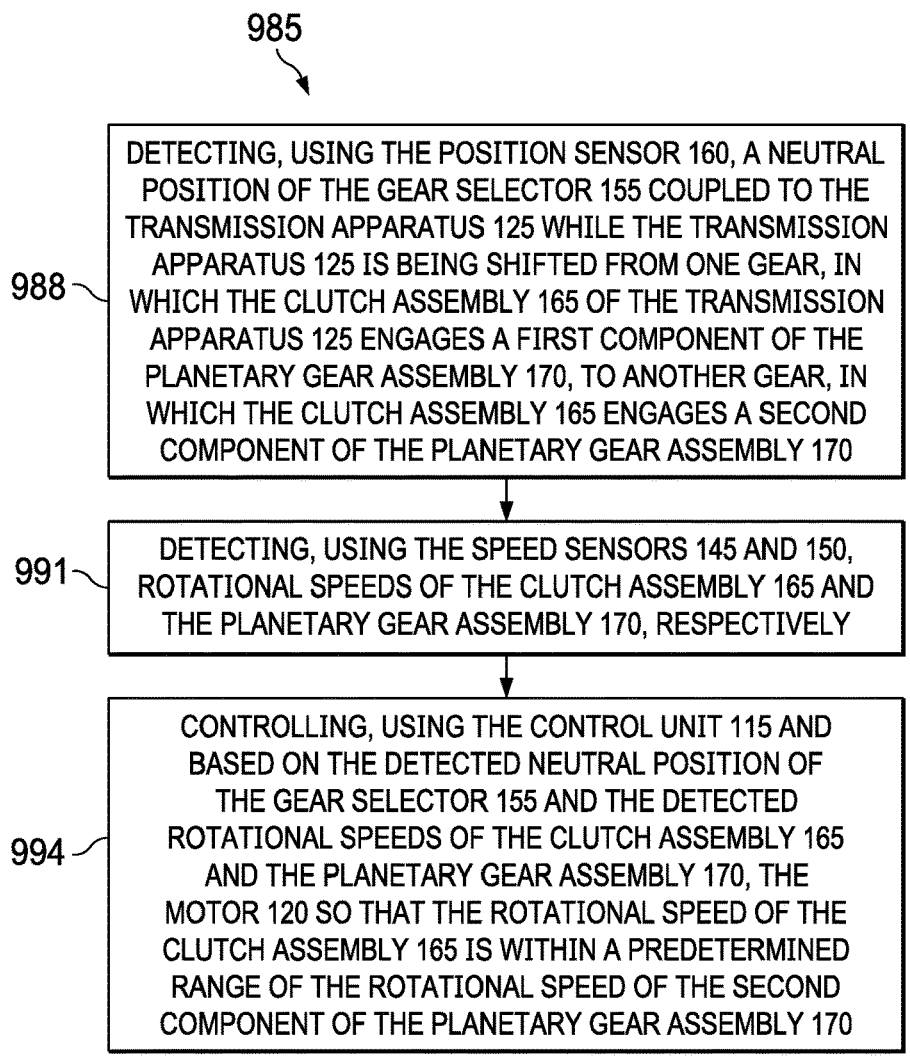
FIG. 5 is a flow diagram of a method for implementing one or more embodiments of the present disclosure.

Referring to FIG. 5, a method of using the transportation system 100 is generally referred to by the reference numeral 985. The method 985 may be executed in response to shifting of the transmission apparatus 125 from one gear (e.g., first, second, third, or fourth gear), in which the clutch assembly 165 of the transmission apparatus 125 engages a first component of the planetary gear assembly 170, to another gear, in which the clutch assembly 165 engages a second component of the planetary gear assembly 170. The method 985 includes at a step 988 detecting, using the position sensor 160, a neutral position of the transmission apparatus 125 while the transmission apparatus 125 is being shifted from the one gear, in which the clutch assembly 165 of the transmission apparatus 125 engages the first component of the planetary gear assembly 170 of the transmission apparatus 125, to the another gear, in which the clutch assembly 165 engages the second component of the planetary gear assembly 170. In the neutral position of the transmission apparatus 125, the clutch assembly 165 is disengaged from the planetary gear assembly 170. At a step 991, using the speed sensor 145 and the speed sensor 150, rotational speeds of the clutch assembly 165 and the planetary gear assembly 170, respectively, are detected. At a step 994, using the control unit 115 and based on the detected neutral position of the transmission apparatus 125 and the detected rotational speeds of the clutch assembly 165 and the planetary gear assembly 170, the motor 120 coupled to the clutch assembly 165 is controlled so that a rotational speed of the clutch assembly 165 is within a predetermined range of a rotational speed of the second component of the planetary gear assembly 170. In some embodiments, the steps 991 and/or 994 are executed during shifting of the transmission apparatus 125, i.e., when the clutch assembly 165 is disengaged from the planetary gear assembly 170.

In some embodiments of the method 985, the clutch assembly 165 includes: the clutch hub 175; a first clutch sleeve (e.g., one of the clutch sleeves 180, 185, 190, or 195) coupled to, and coaxial with, the clutch hub 175, wherein the first clutch sleeve is axially movable relative to the clutch hub 175 to selectively engage a first component (e.g., the corresponding one of the sun gears 605, 610, or 615, or the planet carrier 625) of the planetary gear assembly 170; and a second clutch sleeve (e.g., another one of the clutch sleeves 180, 185, 190, or 195) coupled to, and coaxial with, the clutch hub 175 and/or the first clutch sleeve, wherein the second clutch sleeve is axially movable relative to the clutch hub 175 to selectively engage a second component (e.g., the corresponding one of the sun gears 605, 610, or 615, or the planet carrier 625) of the planetary gear assembly 170. In some embodiments of the method 985, the planetary gear assembly 170 includes the planet gears 620 and the planet carrier 625; wherein each of the planet gears 620 is supported in a rotatable manner by the planet carrier 625; and wherein the first component of the planetary gear assembly 170 is a first sun gear (e.g., one of the sun gears 605, 610, or 615) that engages each of the planet gears 620. In some embodiments of the method 985, each of the planet gears 620 engages the stationary ring gear 630 so that rotation of the first sun gear causes the planet gears 620 to orbit around the first sun gear. In some embodiments of the method 985, the second component of the planetary gear assembly 170 is the planet carrier 625. In some embodiments of the method 985, the second component of the planetary gear assembly 170 is a second sun gear (e.g., another one of the sun gears 605, 610, or 615) that engages each of the planet gears 620 and is coaxial with the first sun gear.

In some embodiments, among other things, the operation of the transportation system 100 and/or the execution of the method 985: shortens the drive system as compared to vehicles using existing automated-manual type transmissions while keeping costs low; shortens the vehicle's wheelbase as compared to vehicles using existing automated-manual type transmissions; improves the steering angle as compared to vehicles using existing automated-manual type transmissions; and improves vehicle maneuverability within close quarters as compared to vehicles using existing automated-manual type transmissions.

Figure 6:
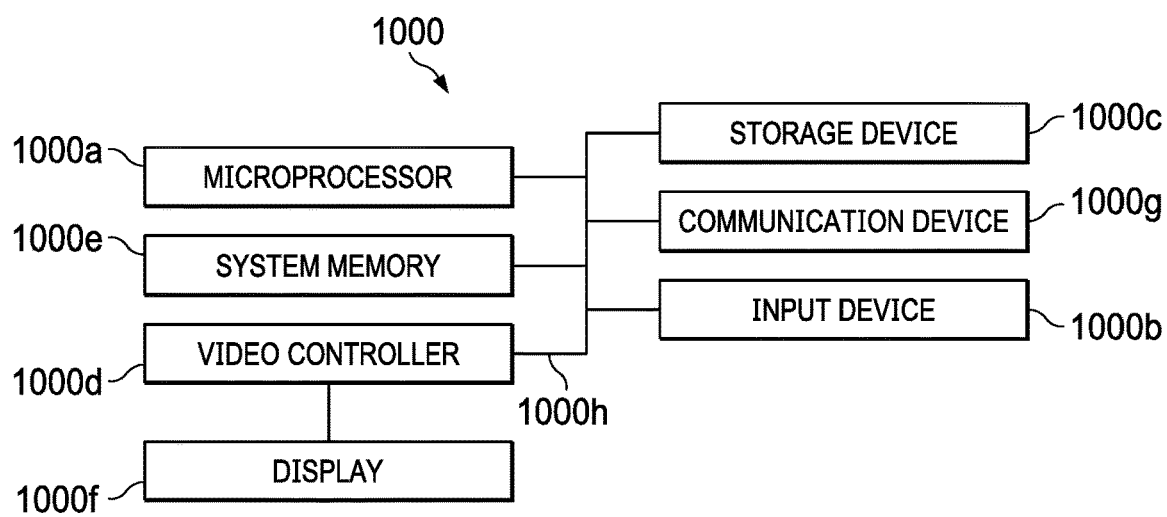
FIG. 6 is a diagrammatic illustration of a computing node for implementing one or more embodiments of the present disclosure.

Referring to FIG. 6, in an embodiment, a computing node 1000 for implementing one or more embodiments of one or more of the above-described elements, control units (e.g., 115), apparatus (e.g., 125), systems (e.g., 100), methods (e.g., 985) and/or steps (e.g., 988, 991, and/or 994), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., 115), apparatus (e.g., 125), systems (e.g., 100), methods (e.g., 985) and/or steps (e.g., 988, 991, and/or 994), or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A first transmission apparatus has been disclosed. The transmission apparatus generally includes a clutch assembly, including: a clutch hub; a first clutch sleeve coupled to, and coaxial with, the clutch hub, wherein the first clutch sleeve is axially movable relative to the clutch hub to selectively engage a first component of a planetary gear assembly; and a second clutch sleeve coupled to, and coaxial with, the clutch hub and/or the first clutch sleeve, wherein the second clutch sleeve is axially movable relative to the clutch hub to selectively engage a second component of the planetary gear assembly. A second transmission apparatus has also been disclosed. The another transmission apparatus generally includes a planetary gear assembly, including: a plurality of planet gears; a planet carrier supporting each of the plurality of planet gears in a rotatable manner; and first and second components; wherein the first component is selectively engageable by a clutch assembly to rotate the planet carrier when the second component is disengaged from the clutch assembly; wherein the second component is selectively engageable by the clutch assembly to rotate the planet carrier when the first component is disengaged from the clutch assembly; and wherein the first component of the planetary gear assembly is a first sun gear that engages first gear teeth on each of the plurality of planet gears.

The foregoing first and second transmission apparatus embodiments may include one or more of the following elements, either alone or in combination with one another:

The clutch hub includes a shaft, a plate extending radially from the shaft, and one or more first windows formed in the plate; the first clutch sleeve includes one or more first fingers extending through the one or more first windows; and the first clutch sleeve further includes a first gear coupled to the one or more first fingers to selectively engage the first component of the planetary gear assembly when the first clutch sleeve is axially moved relative to the clutch hub.

The first clutch sleeve is splined onto the shaft.

The clutch hub further includes one or more second windows formed in the plate; the second clutch sleeve includes one or more second fingers extending through the one or more second windows; and the second clutch sleeve further includes a second gear coupled to the one or more second fingers to selectively engage the second component of the planetary gear assembly when the second clutch sleeve is axially moved relative to the clutch hub.

The second clutch sleeve is splined onto the first clutch sleeve.

The second clutch sleeve is splined onto the plate.

The transmission apparatus further includes the planetary gear assembly, the planetary gear assembly including a plurality of planet gears and a planet carrier; wherein each of the plurality of planet gears is supported in a rotatable manner by the planet carrier; and wherein the first component of the planetary gear assembly is a first sun gear that engages each of the plurality of planet gears.

Each of the plurality of planet gears engages a stationary ring gear so that rotation of the first sun gear causes the planet gears to orbit around the first sun gear.

The second component of the planetary gear assembly is the planet carrier.

The second component of the planetary gear assembly is a second sun gear that engages each of the plurality of planet gears and is coaxial with the first sun gear.

The second component of the planetary gear assembly is a second sun gear that engages second gear teeth on each of the plurality of planet gears and is coaxial with the first sun gear.

A method has also been disclosed. The method generally includes detecting, using a position sensor, a neutral position of a transmission while the transmission is being shifted from one gear, in which a clutch assembly of the transmission engages a first component of a planetary gear assembly of the transmission, to another gear, in which the clutch assembly engages a second component of the planetary gear assembly, wherein, in the neutral position of the transmission, the clutch assembly is disengaged from the planetary gear assembly; and during shifting of the transmission, when the clutch assembly is disengaged from the planetary gear assembly: detecting, using first and second speed sensors, rotational speeds of the clutch assembly and the planetary gear assembly, respectively; and controlling, using a control unit and based on the detected neutral position of the transmission and the detected rotational speeds of the clutch assembly and the planetary gear assembly, a motor coupled to the clutch assembly so that the rotational speed of the clutch assembly is within a predetermined range of the rotational speed of the second component.

The foregoing method embodiment may include one or more of the following elements, either alone or in combination with one another:

The clutch assembly includes: a clutch hub; a first clutch sleeve coupled to, and coaxial with, the clutch hub, wherein the first clutch sleeve is axially movable relative to the clutch hub to selectively engage the first component of the planetary gear assembly; and a second clutch sleeve coupled to, and coaxial with, the clutch hub and/or the first clutch sleeve, wherein the second clutch sleeve is axially movable relative to the clutch hub to selectively engage the second component of the planetary gear assembly.

The planetary gear assembly includes a plurality of planet gears and a planet carrier; wherein each of the plurality of planet gears is supported in a rotatable manner by the planet carrier; and wherein the first component of the planetary gear assembly is a first sun gear that engages each of the plurality of planet gears.

Each of the plurality of planet gears engages a stationary ring gear so that rotation of the first sun gear causes the planet gears to orbit around the first sun gear.

The second component of the planetary gear assembly is the planet carrier.

The second component of the planetary gear assembly is a second sun gear that engages each of the plurality of planet gears and is coaxial with the first sun gear.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A transmission apparatus, comprising:
a clutch assembly, comprising:
  a clutch hub; and
  radially-overlapping first and second clutch sleeves;
wherein the first clutch sleeve is operably coupled to, and coaxial with, the clutch hub, wherein the first clutch sleeve includes a first dog clutch having first clutch teeth, the first clutch sleeve being rotationally fixed and axially movable relative to the clutch hub to selectively engage the first clutch teeth of the first dog clutch with a first component of a planetary gear assembly; and
wherein the second clutch sleeve is operably coupled to, and coaxial with, the clutch hub and/or the first clutch sleeve, wherein the second clutch sleeve includes a second dog clutch having second clutch teeth, the second clutch sleeve being rotationally fixed and axially movable relative to the clutch hub to selectively engage the second clutch teeth of the second dog clutch with a second component of the planetary gear assembly.

2. The transmission apparatus of claim 1, further comprising the planetary gear assembly, the planetary gear assembly comprising a plurality of planet gears and a planet carrier;
  wherein each of the plurality of planet gears is supported in a rotatable manner by the planet carrier; and
  wherein the first component of the planetary gear assembly includes a first sun gear that engages each of the plurality of planet gears.

3. The transmission apparatus of claim 2, wherein each of the plurality of planet gears engages a stationary ring gear so that rotation of the first sun gear causes the planet gears to orbit around the first sun gear.

4. The transmission apparatus of claim 2, wherein the second component of the planetary gear assembly includes a second sun gear that engages each of the plurality of planet gears and is coaxial with the first sun gear.

5. The transmission apparatus of claim 1, wherein the second component of the planetary gear assembly includes third clutch teeth connected to the planet carrier.

6. A transmission apparatus, comprising:
a clutch assembly, comprising:
  a clutch hub;
  a first clutch sleeve coupled to, and coaxial with, the clutch hub, wherein the first clutch sleeve is axially movable relative to the clutch hub to selectively engage a first component of a planetary gear assembly; and
  a second clutch sleeve coupled to, and coaxial with, the clutch hub and/or the first clutch sleeve, wherein the second clutch sleeve is axially movable relative to the clutch hub to selectively engage a second component of the planetary gear assembly;
wherein the clutch hub comprises a shaft, a plate extending radially from the shaft, and one or more first windows formed in the plate;
wherein the first clutch sleeve comprises one or more first fingers extending through the one or more first windows; and
wherein the first clutch sleeve further comprises a first gear coupled to the one or more first fingers to selectively engage the first component of the planetary gear assembly when the first clutch sleeve is axially moved relative to the clutch hub.

7. The transmission apparatus of claim 6, wherein the first clutch sleeve is splined onto the shaft.

8. The transmission apparatus of claim 6, wherein the clutch hub further comprises one or more second windows formed in the plate;
  wherein the second clutch sleeve comprises one or more second fingers extending through the one or more second windows; and
  wherein the second clutch sleeve further comprises a second gear coupled to the one or more second fingers to selectively engage the second component of the planetary gear assembly when the second clutch sleeve is axially moved relative to the clutch hub.

9. The transmission apparatus of claim 8, wherein the second clutch sleeve is splined onto the first clutch sleeve.

10. The transmission apparatus of claim 6, wherein the second clutch sleeve is splined onto the plate.

11. A transmission apparatus, comprising:
a planetary gear assembly, comprising:
  a plurality of planet gears;
  a planet carrier supporting each of the plurality of planet gears in a rotatable manner; and
  first and second radially-overlapping sun gears;
wherein the first sun gear is selectively engageable by first clutch teeth of a first dog clutch of a clutch assembly to rotate the planet carrier when the second sun gear is disengaged from the clutch assembly;
wherein the second sun gear is selectively engageable by second clutch teeth of a second dog clutch of the clutch assembly to rotate the planet carrier when the first sun gear is disengaged from the clutch assembly;
wherein the first sun gear engages first gear teeth on each of the plurality of planet gears;
wherein the second sun gear is coaxial with the first sun gear and engages second gear teeth on each of the plurality of planet gears;
wherein the second gear teeth on each of the plurality of planet gears, respectively, are rotationally fixed relative to the first gear teeth on each of the plurality of planet gears, respectively;
wherein the planetary gear assembly further comprises a third dog clutch connected to the planet carrier; and
wherein the third dog clutch is selectively engageable by third clutch teeth of the clutch assembly to rotate the planet carrier when the first and second sun gears are disengaged from the clutch assembly.

12. The transmission apparatus of claim 11, wherein each of the plurality of planet gears engages a stationary ring gear so that rotation of the first sun gear causes the planet gears to orbit around the first sun gear.

* * * * *